(12) United States Patent
Yamamoto et al.

(10) Patent No.: US 8,164,417 B2
(45) Date of Patent: Apr. 24, 2012

(54) IN-VEHICLE APPARATUS REMOTE CONTROL SYSTEM AND IN-VEHICLE APPARATUS REMOTE CONTROL METHOD

(75) Inventors: Hiroaki Yamamoto, Kobe (JP); Tadamasa Fukae, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1065 days.

(21) Appl. No.: 12/054,696

(22) Filed: Mar. 25, 2008

(65) Prior Publication Data
US 2009/0179772 A1    Jul. 16, 2009

(30) Foreign Application Priority Data
Jan. 11, 2008  (JP) .................................. 2008-004494

(51) Int. Cl.
*G05B 19/00* (2006.01)
(52) U.S. Cl. ...................................... 340/5.61; 340/5.64
(58) Field of Classification Search ................. 340/5.61, 340/5.64, 5.72; 307/10.1
See application file for complete search history.

(56) References Cited

U.S. PATENT DOCUMENTS

| | | | |
|---|---|---|---|
| 4,653,069 A * | 3/1987 | Roeder | 380/31 |
| 6,617,961 B1 * | 9/2003 | Janssen et al. | 340/5.8 |
| 7,031,419 B2 * | 4/2006 | Piirainen | 375/358 |
| 7,227,448 B2 * | 6/2007 | Menard et al. | 340/5.72 |
| 2002/0035505 A1 * | 3/2002 | Ho et al. | 705/13 |
| 2002/0070845 A1 | 6/2002 | Reisinger et al. | |

FOREIGN PATENT DOCUMENTS

| | | |
|---|---|---|
| JP | 02207630 | 8/1990 |
| JP | 06053930 B2 | 2/1994 |
| JP | 6-244821 A | 9/1994 |
| JP | 08181633 | 7/1996 |
| JP | 9-144411 A | 6/1997 |
| JP | 2000-353985 A | 12/2000 |
| JP | 2004-538711 A | 12/2004 |
| JP | 2005-029044 A | 2/2005 |
| JP | 2005207019 A | 8/2005 |
| JP | 2006-207263 A | 8/2006 |
| WO | 00/71843 A2 | 11/2000 |

* cited by examiner

*Primary Examiner* — Vernal Brown
(74) *Attorney, Agent, or Firm* — Sughrue Mion, PLLC

(57) ABSTRACT

A vehicle remote control system includes an in-vehicle transmission unit which transmits an authentication-use inquiry signal and a presence-check inquiry signal; two or more mobile apparatuses, each comprising a reception unit which receives the presence-check inquiry signal and the authentication-use inquiry signal and a transmission unit which transmits to the in-vehicle apparatus a response signal to the presence-check inquiry signal and the authentication-use inquiry signal; an in-vehicle reception unit which receives the response signals transmitted from the transmission units of the two or more mobile apparatuses; and an in-vehicle operation control unit which controls an operation state of the in-vehicle apparatus when a response code in at least one of the response signals received by the in-vehicle apparatus has been compared.

8 Claims, 19 Drawing Sheets

FIG.2
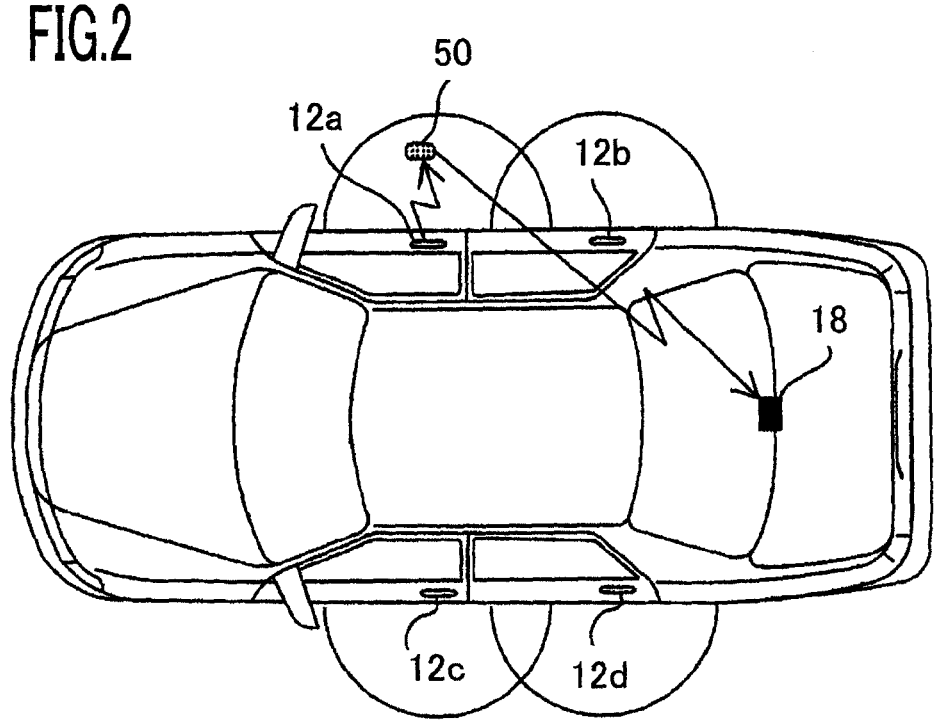
(a)
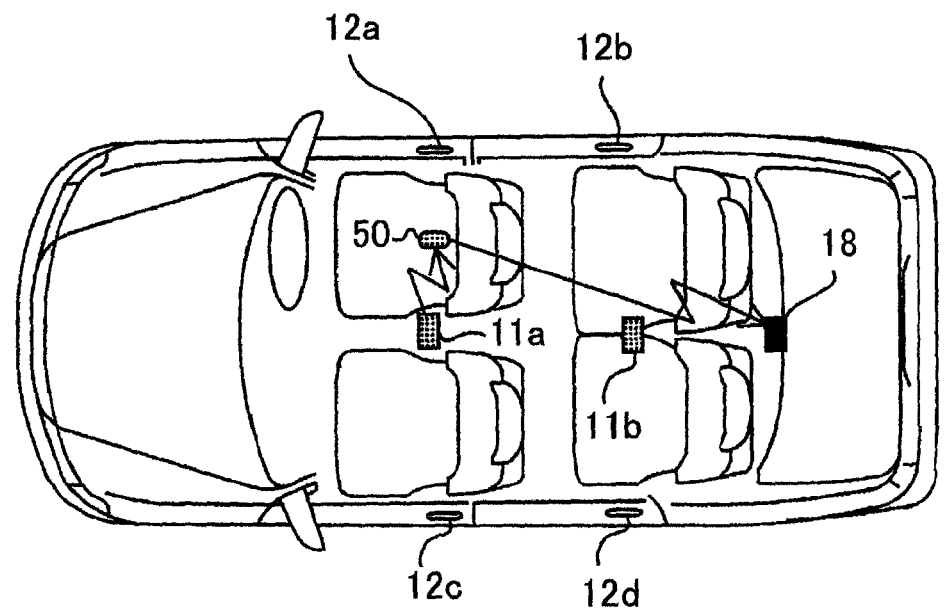
(b)

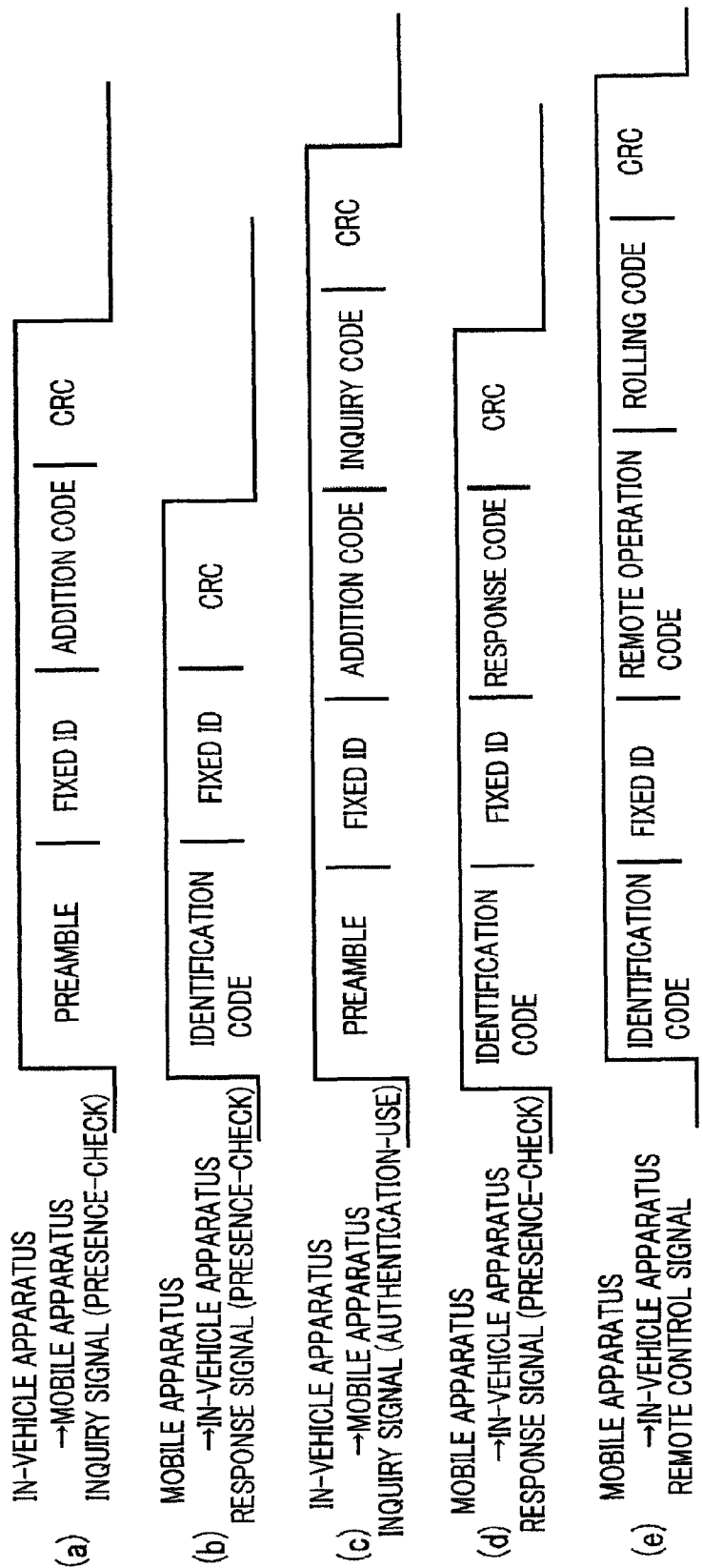

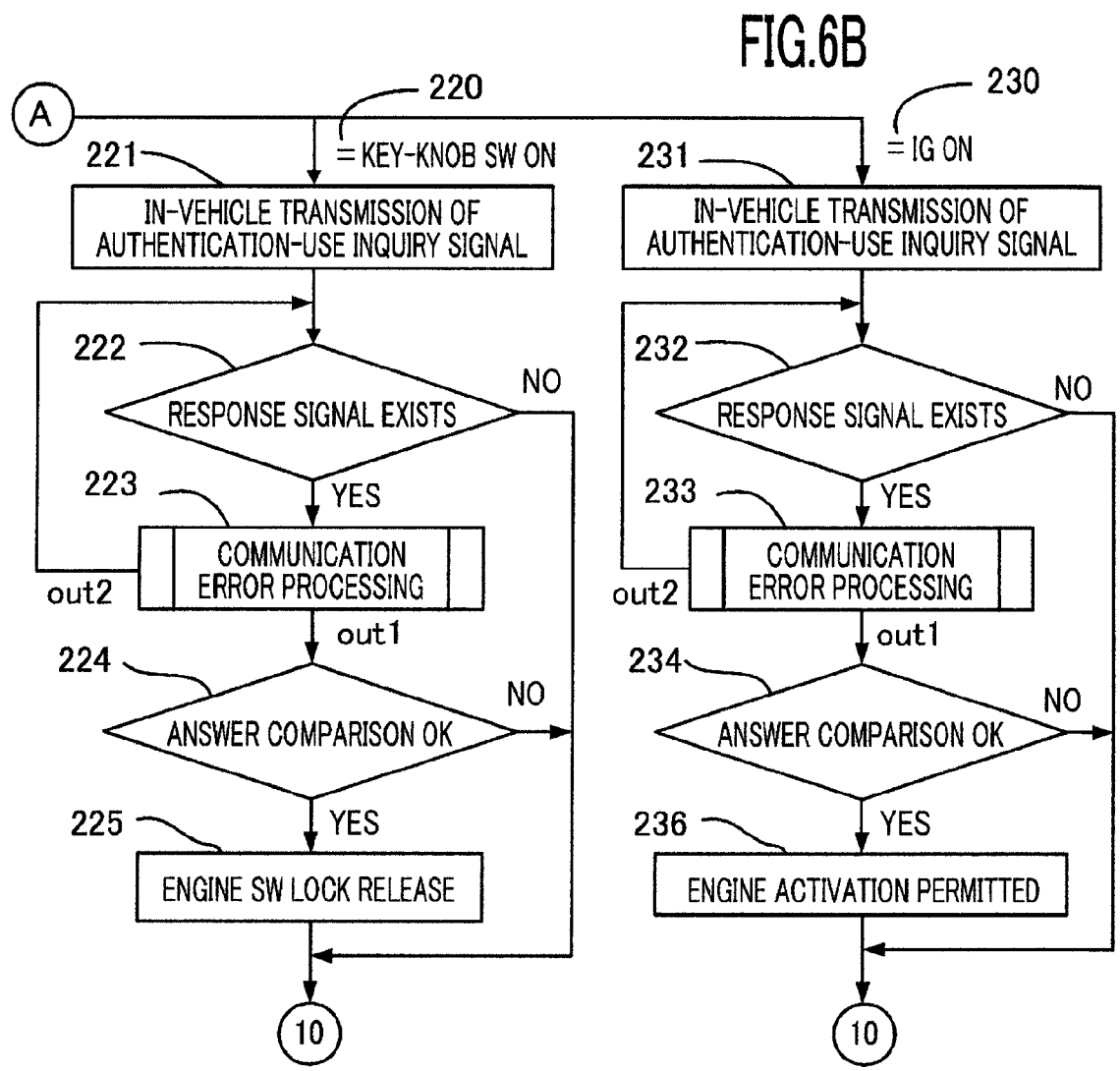

FIG.8

| MAIN FUNCTIONS | CONTROL LOGIC | ROLE OF COMMUNICATION WITH MOBILE APPARATUS |
|---|---|---|
| UNLOCK PERMISSION | PERMITTED WHEN AN AUTHENTIC MOBILE APPARATUS IS OUTSIDE THE VEHICLE AND WITHIN THE COVERAGE AREA OF AN OUT-VEHICLE LF ANTENNA LOCATED AT THE SAME POSITION AS THE UNLOCK OPERATION SW. | • CONFIRMATION OF AN EFFECTIVE REPLY FROM THE OUTSIDE OF THE VEHICLE |
| LOCK PERMISSION | PERMITTED WHEN AN AUTHENTIC MOBILE APPARATUS IS WITHIN THE COVERAGE AREA OF AN OUT-VEHICLE LF ANTENNA LOCATED AT THE SAME POSITION AS THE LOCK OPERATION SW, AND NO AUTHENTIC MOBILE APPARATUS EXISTS INSIDE THE VEHICLE. | • CONFIRMATION OF NO REPLY INSIDE THE VEHICLE<br>• CONFIRMATION OF AN EFFECTIVE REPLY FROM THE OUTSIDE OF THE VEHICLE |
| KEY-CYLINDER UNLOCK | PERMITTED IN THE CASE WHERE AN AUTHENTIC MOBILE APPARATUS IS INSIDE THE VEHICLE WHEN SW IS OPERATED. | • CONFIRMATION OF AN EFFECTIVE REPLY INSIDE THE VEHICLE |
| ENGINE ACTIVATION PERMISSION | PERMITTED IN THE CASE WHERE AN AUTHENTIC MOBILE APPARATUS IS INSIDE THE VEHICLE WHEN IG-ON IS OPERATED. | • CONFIRMATION OF AN EFFECTIVE REPLY INSIDE THE VEHICLE |
| ALARM FOR MOBILE APPARATUS TAKE-OUT | ALARMED IN THE CASE WHERE, WHEN A DOOR IS OPENED OR CLOSED, THE KEY CYLINDER IS AT THE NON-LOCK POSITION AND NO MOBILE APPARATUS EXISTS IN THE VEHICLE. | • CONFIRMATION OF NO REPLY INSIDE THE VEHICLE |

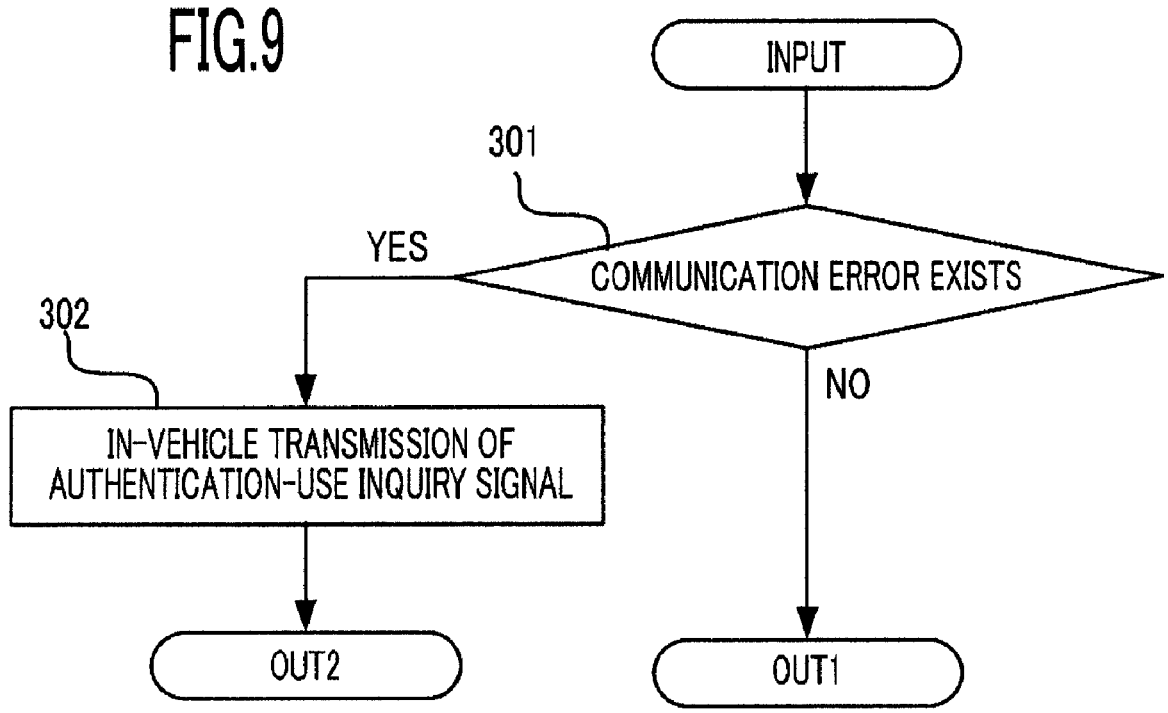

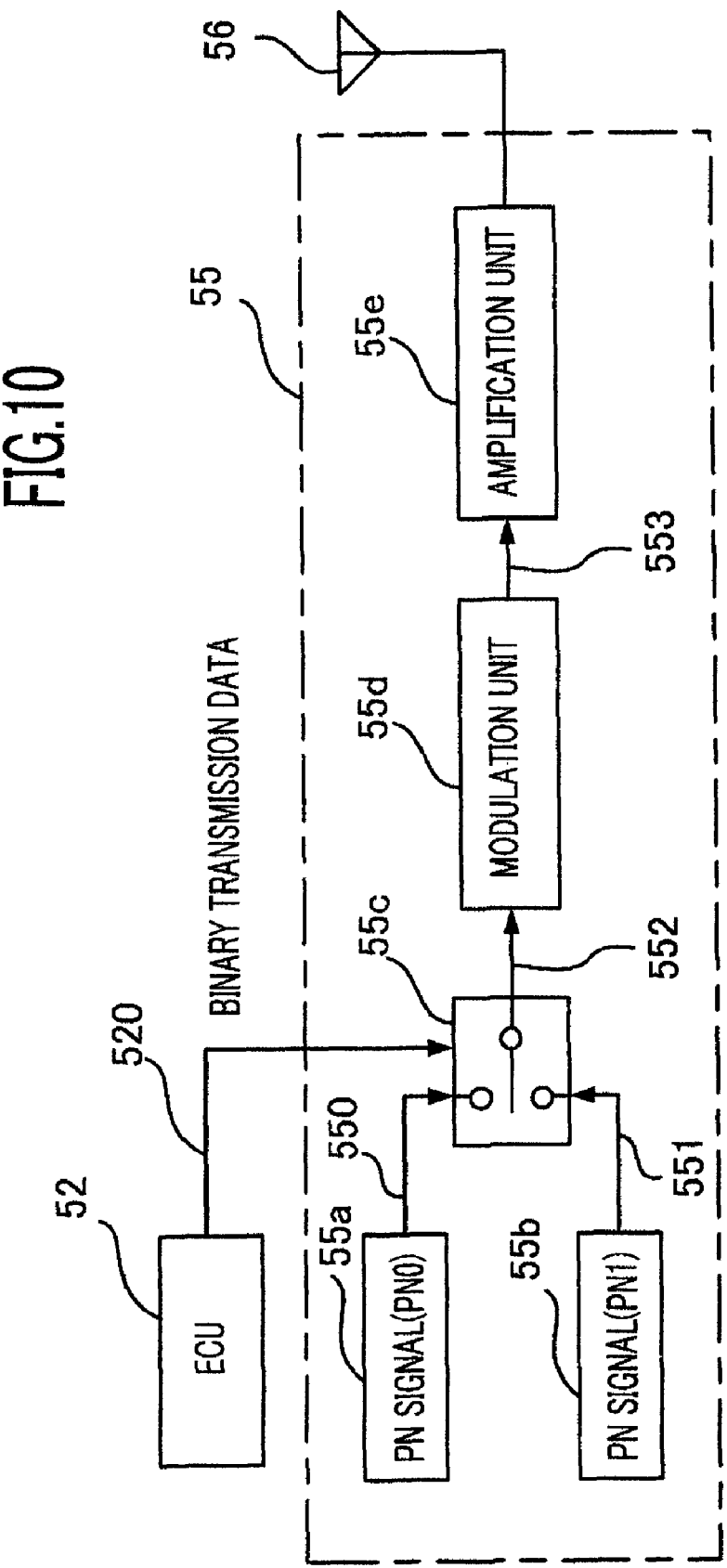

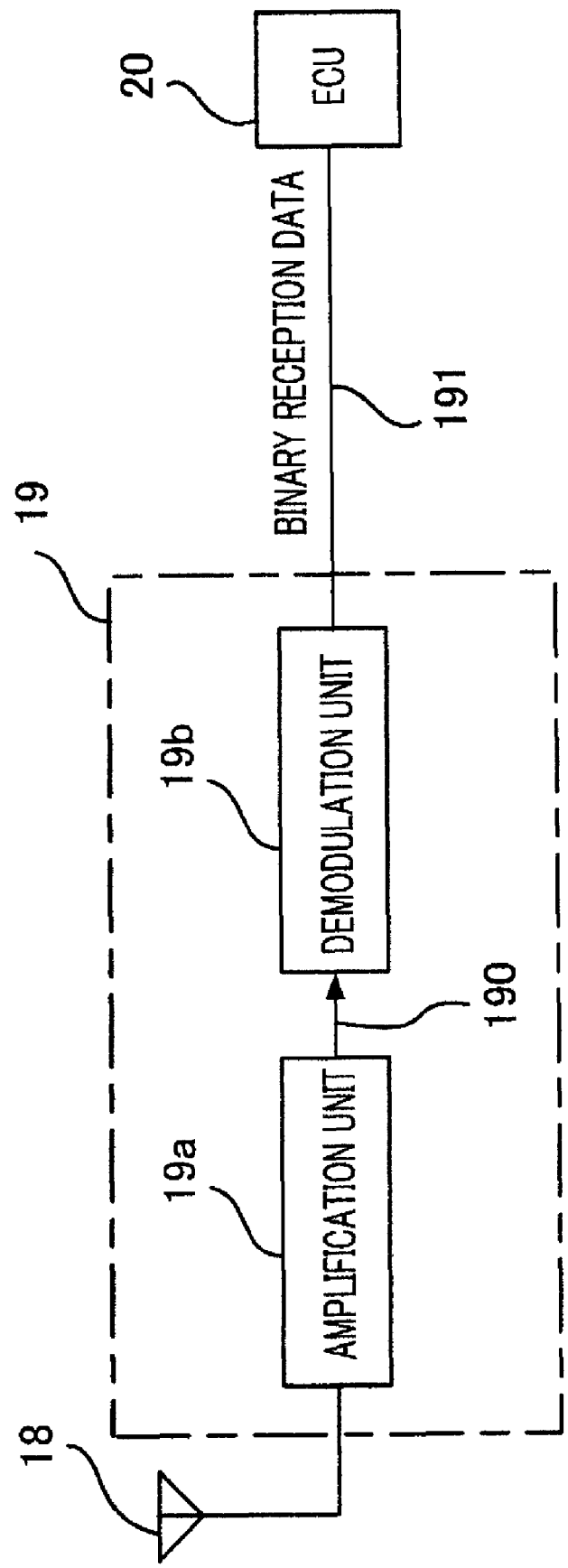

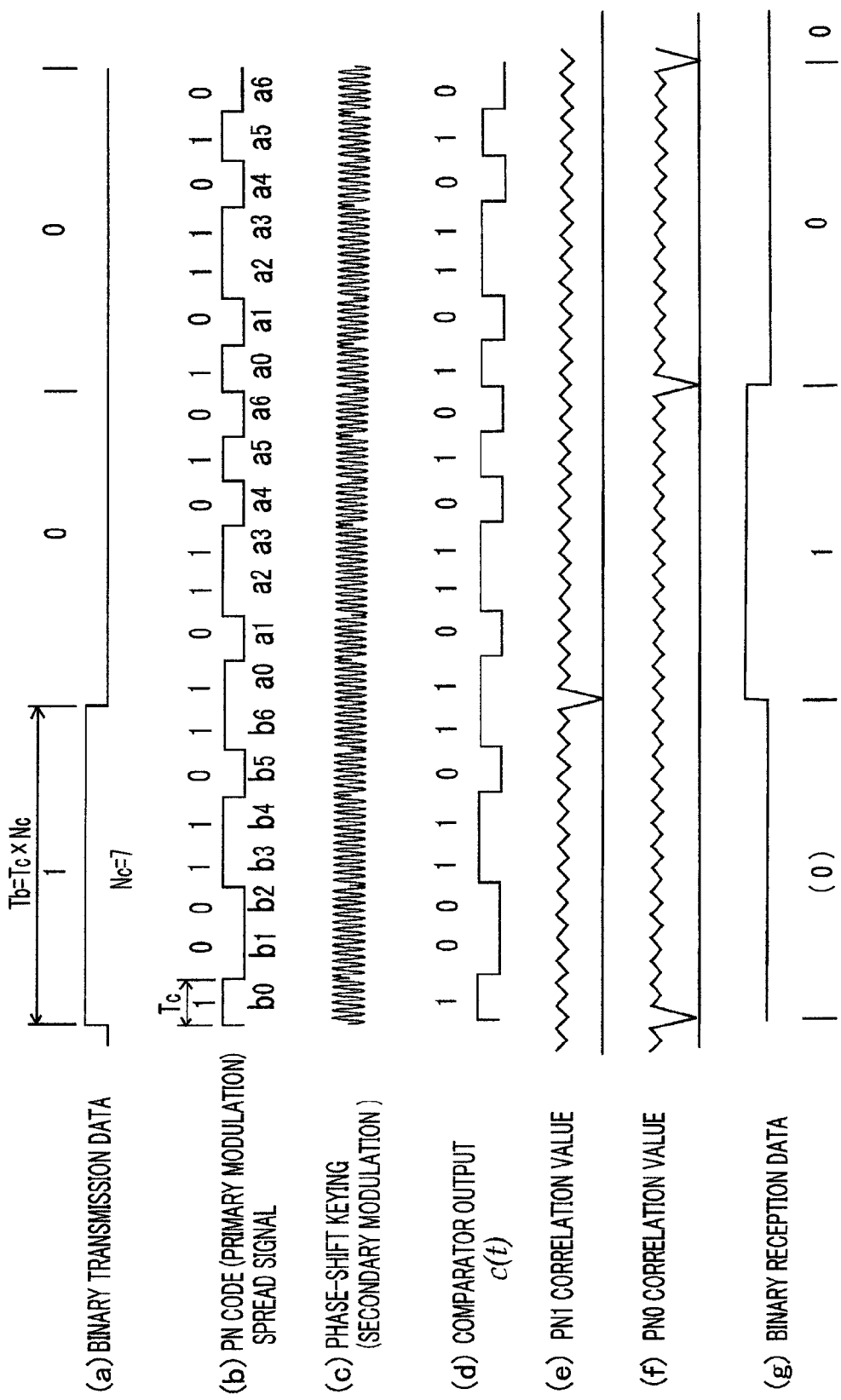

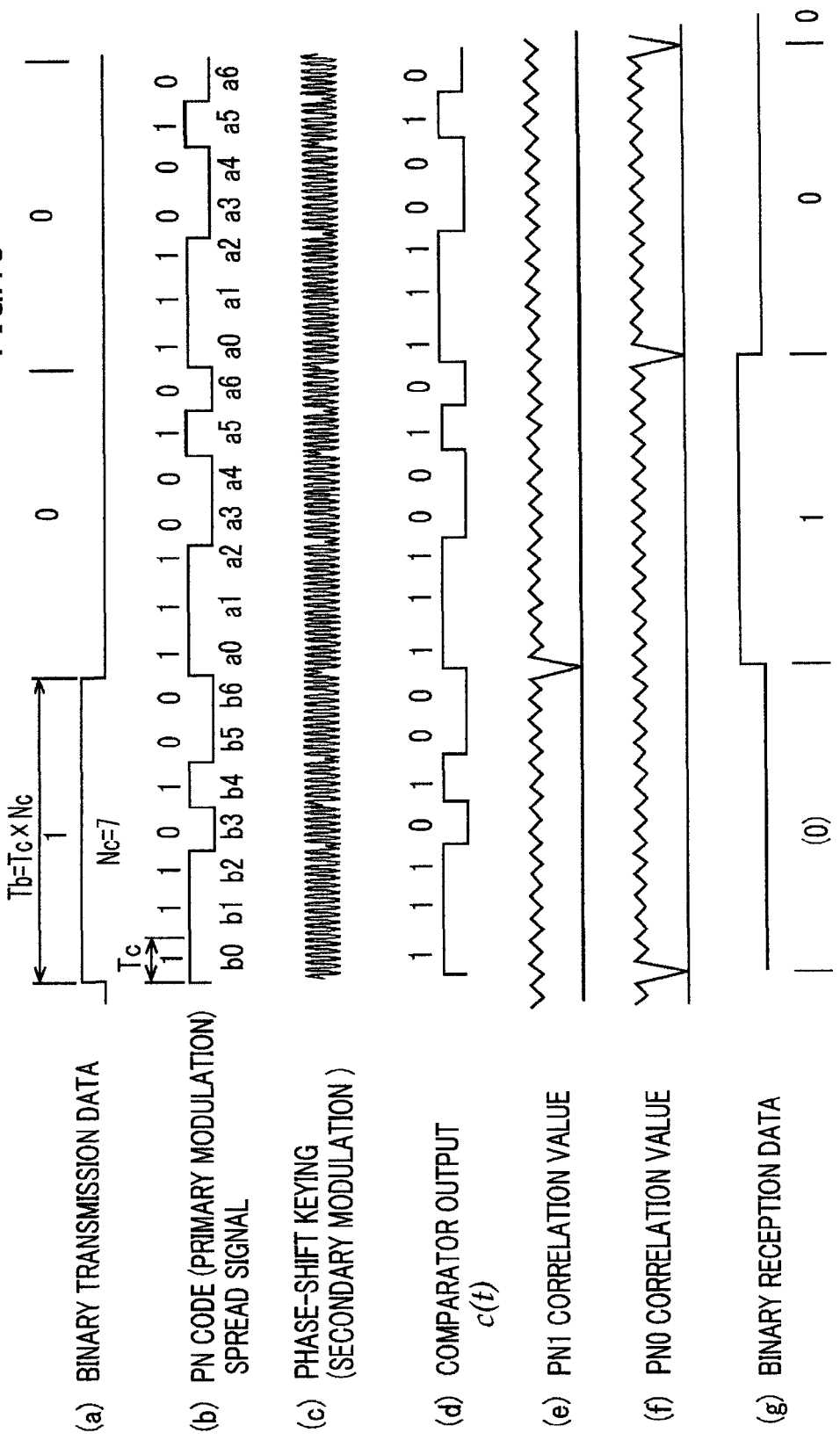

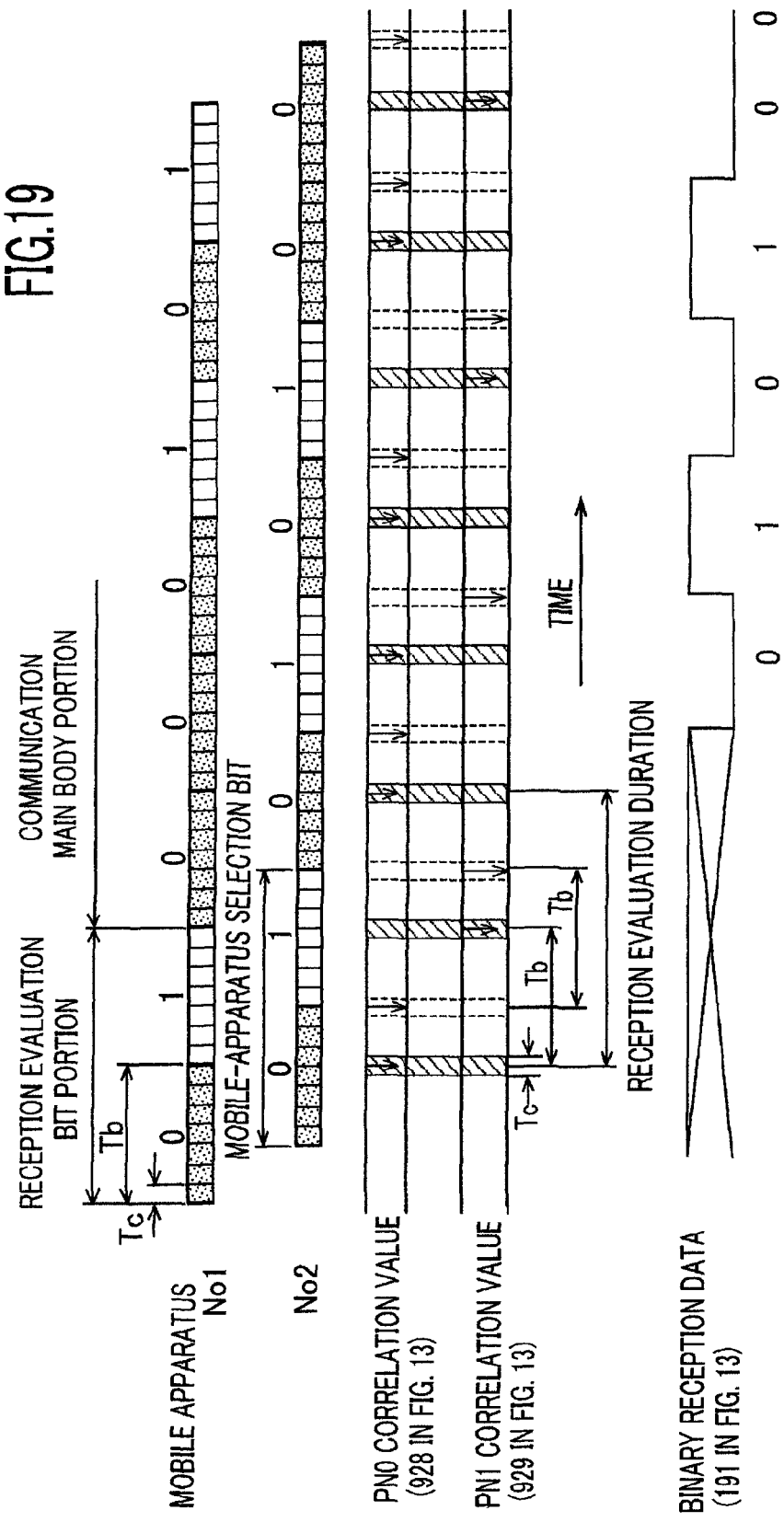

IN-VEHICLE APPARATUS REMOTE CONTROL SYSTEM AND IN-VEHICLE APPARATUS REMOTE CONTROL METHOD

BACKGROUND OF THE INVENTION

1. Field of the Invention

The present invention relates to an in-vehicle apparatus remote control system and an in-vehicle apparatus remote control method for performing code comparison through communication with a mobile apparatus and controlling permission of the usage of a vehicle, based on the result of the comparison.

2. Description of the Related Art

To date, in addition to a remote operation function of manipulating the operation unit of a mobile apparatus so as to lock or unlock the door keys of a vehicle, there has been a smart entry system in which, without manipulating the operation unit, a return code signal is transmitted in response to a transmission request signal from the vehicle and the code is compared, so that the door keys are locked or unlocked.

For example, Patent Document 1 (Japanese Patent Laid-Open No. 1993-106376) discloses a keyless entry system (i.e., a smart entry system) configured with a mobile wireless apparatus provided with a first transmission means that transmits a response signal when a first reception means receives a calling signal and an in-vehicle wireless apparatus provided with a control means that outputs a signal for unlocking the door keys of a vehicle when a second reception means receives the response signal that is transmitted after the calling signal transmitted at a predetermined interval from a second transmission means has been received, and that outputs a signal for locking the door keys of the vehicle when the second reception means receives no response signal.

Additionally, to date, there has been a smart start system that makes it possible to perform engine start operation without utilizing any mechanical key, by transmitting a return code signal in response to a transmission request signal from a vehicle and comparing the code, thereby unlocking a steering lock mechanism and releasing the operation of an engine start prohibition device.

For example, Patent Document 2 (Japanese Patent Laid-Open No. 1988-1765) discloses an ignition system (i.e., a smart start system) configured with respective means that permit unlocking operation for the steering lock mechanism, switching operation for the engine switch, and switching operation for the accessory switch, when a calling signal is transmitted to a mobile wireless apparatus, a PIN code is received and compared with an internal code, and they coincide with each other.

In addition, a system in which the foregoing smart entry system and smart start system are combined is referred to as a smart entry/start system.

In a smart entry/start system, the responsiveness to manual operations, such as foregoing door-key locking and unlocking and key-cylinder unlocking, is an important performance.

One of the problems is how to shorten communication time for code verification so as to reduce response time.

For example, Patent Document 3 (Japanese Patent Laid-Open No. 1997-144411) discloses that, in a keyless entry system in which, while a receiver provided in a vehicle transmits a search signal for searching for a mobile transmitter, a transmitter transmits an ID code signal which is set for each transmitter, in response to the reception of the search signal, and then in the case where the ID code signal received by the receiver provided in the vehicle coincides with an ID code signal set for the vehicle, the door keys are unlocked, the transmitter has a transmission means for transmitting the ID code signal after a preset delay time from the reception of the search signal transmitted from the vehicle.

As described above, in the conventional keyless entry system disclosed in Patent Document 3, the communication between the receiver provided in a vehicle and a plurality of mobile transmitters is performed in accordance with the time-slot method; therefore, the more the transmitters (i.e., mobile apparatuses) are, the more time the communication takes.

In contrast, Patent Document 4 (National Publication of International Patent Application No. 2003-500957) discloses a remote access control method, which is a method of controlling remote access by use of an apparatus provided with a transceiver unit, in which the transceiver unit transmits a polling signal for simultaneously activating all access code generators; after that, all the access code generators that receive the polling signal substantially concurrently transmit respective inherent access code signals; and the transceiver unit performs separation of the access code signals that are simultaneously received, based on respective features added on the access code signal. Moreover, Patent Document 4 describes that, in the process of the communication between the in-vehicle unit and the access code generators to respond, the access code generators are made to respond by means of a single common polling signal; the access code generators respond temporally in parallel; and respective features that enable temporally parallel processing in the in-vehicle unit are added on the transmission signals through modulation.

In other words, in Patent Document 4, a spread-spectrum communication method is proposed which is capable of multiple access and in which communication time is constant regardless of the number of transmitters (mobile apparatuses)

However, the communication method according to the foregoing proposal requires as many kinds of PN codes (pseudo-noise code, i.e., pseudorandom signal) as the number of mobile apparatuses (=the number of vehicles produced× the number of mobile apparatuses/vehicle).

Accordingly, the PN code with sufficiently long code length is required; for example, in order to prepare approximately one thousand kinds of balanced GOLD codes in which the cross-correlation between codes are low and the number of occurrences of "1" is balanced with that of "−1", the code length is required to be 225 bits (chip).

In addition, because a first reception means requires as many correlators as the number of mobile apparatuses, the circuit scale becomes large and the production cost is raised.

In contrast, as a method in which the length of the PN code is shortened and the number of correlators is reduced, a method is well known in which identical PN codes whose phases are different by more than one chip from one another are utilized as independent PN codes; for example, as proposed in Patent Document 5 (Japanese Patent Laid-Open No. 1994-244821), there exists a method in which PN codes are multiplexed.

However, as described later, in the smart entry/start system, an LF-band electric wave (typically, 125 KHz) is utilized for the communication between the first transmission means in an vehicle and the second reception means in a mobile apparatus; a UHF-band electric wave (typically, 315 MHz) is utilized for the communication between the first reception means in an vehicle and the second transmission means in a mobile apparatus.

Although, in order to realize the foregoing phrase difference of more than one chip, management accuracy on the order of one microsecond is required, the reception timing, of the second reception means, which determines the transmission timing of the second transmission means cannot be managed with accuracy of less than approximately several wave lengths (several tens of microseconds) of a utilized LF-band radio wave, due to variations in the mobile apparatuses and the distances from the transmission antenna.

Accordingly, it is difficult to securely prevent communication collisions (communication interferences) among the mobile apparatuses; thus, unless further measures are taken, the reliability of the proposal in Patent Document 5 is low, and the multiplexing utilizing the phase difference is not feasible.

Expanding the length of the PN code in such an extent as to enable the temporal management causes the deterioration of the communication speed and the scale enlargement of the correlator; therefore, this method is not desirable in terms of a system.

As described above, in the conventional keyless entry system disclosed in Japanese Patent Laid-Open No. 1997-144411, the communication between the receiver provided in a vehicle and a plurality of mobile transmitters is performed in accordance with the time-slot method; therefore, the more the transmitters (mobile apparatuses) are, the more time the communication takes.

Additionally, the conventional technology (remote access control method) disclosed in National Publication of International Patent Application No. 2003-500957 requires PN codes in the number corresponding to the number of the mobile apparatuses; therefore, the length of the PN code is considerably long and the reception means in a vehicle requires as many correlators as the number of the mobile apparatuses, whereby the circuit scale is enlarged and the production cost is raised.

Additionally, it is difficult for "the method of multiplexing utilizing spread spectrum communication system" disclosed in Japanese Patent Laid-Open No. 1994-244821 to securely prevent communication collision among the mobile apparatuses; thus the reliability of the communication is low.

SUMMARY OF THE INVENTION

The present invention has been implemented in order to solve the foregoing problems; it is the objective of the present invention to provide an in-vehicle apparatus remote control system in which the responsiveness can be enhanced through multiplex communication and the reliability of communication is high, and that is small-sized, inexpensive, and suitable for preventing unauthorized use and theft of a vehicle, or an in-vehicle apparatus remote control method in which the responsiveness can be enhanced through multiplex communication and the reliability of communication is high, and that is suitable for preventing unauthorized use and theft of a vehicle.

An in-vehicle apparatus remote control system according to the present invention includes a transmission means of an in-vehicle apparatus, for transmitting an authentication-use inquiry signal and a presence-check inquiry signal to two or more mobile apparatuses; a reception means of the mobile apparatus, for receiving the inquiry signals; a transmission means of the mobile apparatus, for receiving the inquiry signal and then transmitting a response signal to the in-vehicle apparatus; a reception means of the in-vehicle apparatus, for receiving the response signal transmitted from the transmission means of the mobile apparatus; and an operation control means for controlling the operation state of the in-vehicle device when a response code in the response signal transmitted to the in-vehicle apparatus has been compared.

The transmission means of the mobile apparatus converts the response signal into binary data, modulates a carrier wave with a digital signal obtained through modulation by a plurality of pseudo-random codes corresponding to the binary data, and then transmits the response signal; the reception means of the in-vehicle apparatus evaluates the correlation of the received response signal by use of a plurality of correlators corresponding to the plurality of pseudo-random codes and demodulates the response signal, based on outputs of the plurality of correlators; and the transmission means of the in-vehicle apparatus retransmits the inquiry signal to the mobile apparatus when there has been outputs from the plurality of correlators within a predetermined time of the occurrence of the pseudo-random code.

Additionally, an in-vehicle apparatus remote control method according to the present invention includes a transmission step in an in-vehicle apparatus, of transmitting an authentication-use inquiry signal and a presence-check inquiry signal to two or more mobile apparatuses; a reception step in the mobile apparatus, of receiving the inquiry signals; a transmission step in the mobile apparatus, of receiving the inquiry signal and then transmitting a response signal to the in-vehicle apparatus; a reception step in the in-vehicle apparatus, of receiving the response signal transmitted through the transmission step in the mobile apparatus; and an operation control step of controlling the operation state of the in-vehicle device when a response code in the response signal transmitted to the in-vehicle apparatus has been compared.

In the transmission step in the mobile apparatus, the response signal is converted into binary data, a carrier wave is modulated with a digital signal obtained through modulation by a plurality of pseudo-random codes corresponding to the binary data, and then the response signal is transmitted; in the reception step in the in-vehicle apparatus, the correlation of the received response signal is evaluated by use of a plurality of correlators corresponding to the plurality of pseudo-random codes, and the response signal is demodulated, based on outputs of the plurality of correlators; and in the transmission step in the in-vehicle apparatus, the inquiry signal is retransmitted to the mobile apparatus when there has been outputs from the plurality of correlators within a predetermined time of the occurrence of the pseudo-random code.

Accordingly, in an in-vehicle apparatus remote control system according to the present invention, the transmission means of a mobile apparatus converts a response signal into binary data, modulates a carrier wave with a digital signal obtained through modulation by a plurality of pseudo-random codes corresponding to the binary data, and then transmits the response signal; the reception means of an in-vehicle apparatus evaluates the correlation of the received response signal by use of a plurality of correlators corresponding to the plurality of pseudo-random codes and demodulates the response signal, based on the outputs of the plurality of correlators; and the transmission means of the in-vehicle apparatus retransmits an inquiry signal to the mobile apparatus when there has been outputs from the plurality of correlators within a predetermined time of the occurrence of the pseudo-random code.

Therefore, an in-vehicle apparatus remote control system can be provided in which the responsiveness can be enhanced through multiplex communication and the reliability of communication is high, and that is small-sized, inexpensive, and suitable for preventing unauthorized use and theft of a vehicle Moreover, in an in-vehicle apparatus remote control method according to the present invention, in the transmission step in the mobile apparatus, the response signal is converted into binary data, a carrier wave is modulated with a digital signal obtained through modulation by a plurality of pseudo-random codes corresponding to the binary data, and then the response signal is transmitted; in the reception step in the in-vehicle apparatus, the correlation of the received response signal is evaluated by use of a plurality of correlators corresponding to the plurality of pseudo-random codes and the response signal is demodulated based on the outputs of the plurality of correlators; and in the transmission step of the in-vehicle apparatus retransmits an inquiry signal to the mobile apparatus when there has been outputs from the plurality of correlators within a predetermined time of the occurrence of the pseudo-random code.

Therefore, an in-vehicle apparatus remote control method can be provided in which the responsiveness can be enhanced through multiplex communication and the reliability of communication is high, and that is suitable for preventing unauthorized use and theft of a vehicle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a set of views symbolically illustrating the arrangement state of the in-vehicle transmission antennas and the out-vehicle transmission antennas in the in-vehicle apparatus and the status of the communication between the foregoing antennas and a mobile apparatus;

FIG. 5 is a set of charts representing configuration examples of an authentication-use inquiry signal and a presence-check inquiry signal, respective response signals corresponding to these inquiry signals, and a remote control signal;

FIGS. 6A and 6B configure a flowchart for explaining the operation of the in-vehicle apparatus according to Embodiment 1 when the in-vehicle apparatus performs communication with a mobile apparatus;

FIG. 8 is a table representing main functions realized by the controls to be explained with reference to the flowcharts illustrated in FIGS. 6A and 6B and FIG. 7;

FIG. 9 is a detailed flowchart for the step 205 illustrated in FIG. 6A;

FIG. 10 is a block diagram illustrating the detail of the configuration of the transmission unit in the mobile apparatus according to Embodiment 1;

FIG. 11 is a block diagram illustrating the detail of the configuration of the reception unit in the in-vehicle apparatus according to Embodiment 1;

FIG. 12 is a signal timing chart for explaining an example of the operation of the in-vehicle apparatus remote control system according to Embodiment 1;

FIG. 18 is a chart for explaining the distinguishing operation of an in-vehicle apparatus remote control system according to Embodiment 6;

FIG. 19 is a timing chart for explaining the operation of the demodulation unit of the reception unit in an in-vehicle apparatus remote control system according to Embodiment 6;

DETAILED DESCRIPTION OF THE INVENTION

Figure 1:
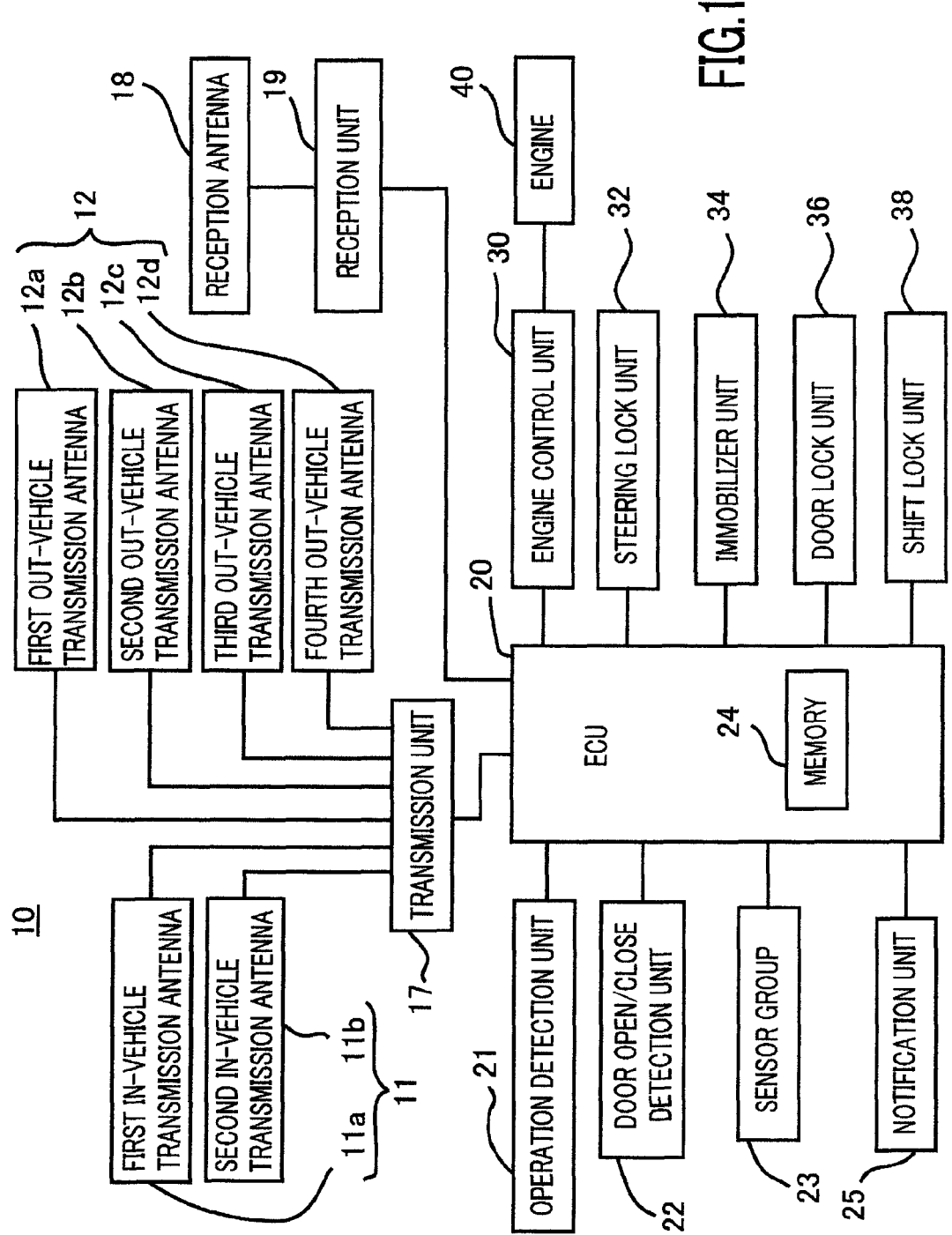
FIG. 1 is a block diagram illustrating the overall configuration of the in-vehicle apparatus in an in-vehicle apparatus remote control system according to Embodiment 1.

An embodiment of the present invention will be explained below with reference to the accompanying drawings.

In addition, the same reference characters in the figures denote the same or equivalent constituent elements.

Embodiment 1

FIG. 1 is a block diagram illustrating the overall configuration of the in-vehicle apparatus in an in-vehicle apparatus remote control system according to Embodiment 1.

As illustrated in FIG. 1, an in-vehicle apparatus 10 has, as an in-vehicle transmission antenna 11, a first in-vehicle transmission antenna 11a and a second in-vehicle transmission antenna 11b and, as an out-vehicle transmission antenna 12, six transmission antennas, i.e., first to fourth out-vehicle transmission antennas 12a to 12d.

FIG. 2 is a set of views symbolically illustrating the arrangement state of the in-vehicle transmission antennas and the out-vehicle transmission antennas in the in-vehicle apparatus and the status of the communication between the foregoing antennas and a mobile apparatus.

In addition, FIGS. 2(a) and 2(b) illustrate a case where a mobile apparatus 50 is situated outside a vehicle and a case where the mobile apparatus 50 is situated inside the vehicle, respectively.

As illustrated in FIGS. 2(a) and 2(b), the first to fourth out-vehicle transmission antennas 12a to 12d are provided, for example, on the respective door handle portions of the vehicle (four-wheel vehicle).

In contrast, the first in-vehicle transmission antenna 11a is provided in the center console portion inside the vehicle, and the second in-vehicle transmission antenna 11b is provided in the vicinity of a place under a rear sheet.

As illustrated in FIG. 1, the first and second in-vehicle transmission antennas 11a and 11b are connected to a transmission unit 17 of the in-vehicle apparatus 10, and the transmission unit 17 is connected to an ECU (electronic control unit) 20.

The ECU 20 supplies the transmission unit 17 with a transmission code and a signal for designating one of the in-vehicle transmission antennas (i.e., one of the first and second in-vehicle transmission antennas 11a and 11b), and a signal modulated with the transmission code, e.g., an inquiry signal (a signal for the authentication or the presence check of the mobile apparatus) having a frequency of 125 KHz is transmitted to the designated mobile apparatus 50.

Additionally, as illustrated in FIG. 2, a reception antenna 18 is provided in the vehicle; a signal (e.g., a signal having a frequency of 315 MHz), from the mobile apparatus 50, which is received by the reception antenna 18 is demodulated in a reception unit 19 and then supplied to the ECU 20.

A memory 24 is incorporated in the ECU 20; ID codes for an inquiry signal and an immobilizer described later and encrypted keys for the immobilizer and for the decryption of an answer code are stored in the memory 24. In addition, an immobilizer is a device for preventing an engine from being erroneously activated so that the theft of the vehicle is prevented.

For example, a plurality of encrypted keys, which are different from one another, corresponding to an inquiry code for locking the doors, an ID code for a transponder, and the like are stored in the memory 24.

The memory 24 is a nonvolatile memory such as an EEPROM; even though the power source therefor is cut off, the contents thereof are held.

An operation detection unit 21 is adapted to detect various switch operations by a user; for example, the operation detection unit 21 detects the positions (positions for activation, ignition-on, accessory-on/off, lock, and the like) of an activation switch (a switch for supplying a signal for starting the transmission of an inquiry signal), a key-knob switch for activating communication for unlocking through pressing the engine switch, and the engine switch, and supplies the operation detection signal to the ECU 20.

A door open/close detection unit 22 detects the open/close status of each of the doors and the lock/unlock status of each of the doors and then supplies the detected signal to the ECU 20.

A sensor group 23 includes various sensors that detect the vehicle speed, the transmission position, the operation state of the engine; the detected signals obtained through the various sensors are supplied to the ECU 20.

A steering lock unit 32, an immobilizer unit 34, a door lock unit 36, a shift lock unit 38, and a notification unit 25 are connected to ECU 20.

The steering lock unit 32 not only releases a pivoting lock mechanism from the lock position of the engine switch, but also releases a mechanical lock mechanism for steering operation.

When the position of the engine switch is restored to the lock position, both the lock mechanisms are brought into the lock state.

The immobilizer unit 34 is a mechanism for prohibiting fuel supply to an engine 40 and ignition operation.

The door lock unit 36 is a mechanism for locking and unlocking all the doors.

The shift lock unit 38, which is a lock device for prohibiting the transmission-gear shift mechanism from switching over the position of the gear from the parking range to another range; ECU 20 outputs a lock-release permission/non-permission signal.

The notification unit 25 includes an answerback device for, as answerbacks, lightening the vehicle light and blowing the horn when the doors are locked or unlocked, an alarm device for making a buzzing sound in order to give various kinds of alarms, and a display device for displaying the states of various operations.

An engine control unit 30 is connected to ECU 20; the engine control unit 30 not only controls the start of the engine 40 by use of a starter motor, but also can control driving/stopping of the engine 40.

Figure 3:
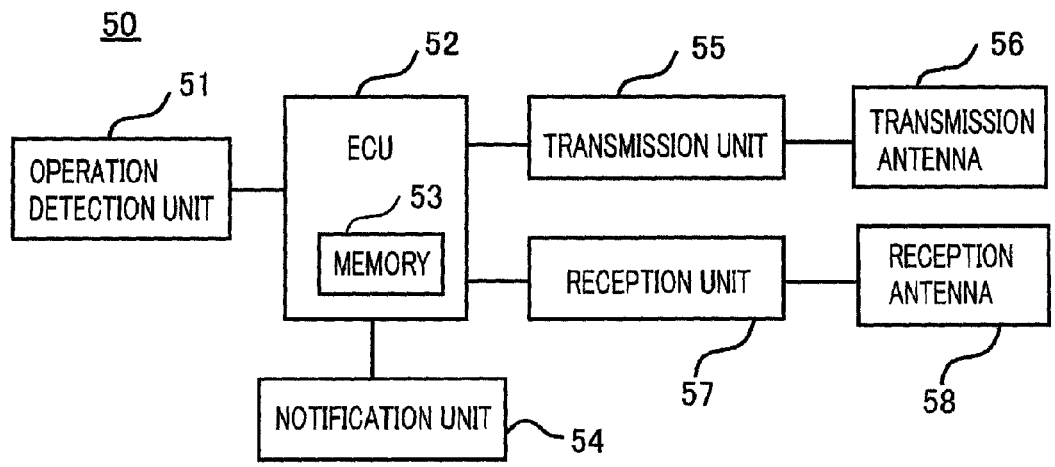
FIG. 3 is a block diagram illustrating the overall configuration of a mobile apparatus in the in-vehicle apparatus remote control system according to Embodiment 1.

FIG. 3 is a block diagram illustrating the overall configuration of a mobile apparatus in an in-vehicle apparatus remote control system according to Embodiment 1.

A memory 53 is incorporated in ECU 52; in normal conditions, ID codes and encrypted keys that are the same as those stored in the memory 24 in the in-vehicle apparatus are regularly stored in the memory 53.

As illustrated in FIG. 50, a mobile apparatus 50 has a transmission antenna 56 and a reception antenna 58.

The transmission antenna 56 is connected to a transmission unit 55; the transmission unit 55 is connected to ECU 52; the reception antenna 58 is connected to a reception unit 57; the reception unit 57 is connected to ECU 52.

An inquiry signal (e.g., an inquiry signal having a frequency of 125 KHz), from the mobile apparatus 10, which has been received by the reception antenna 58 is demodulated in the reception unit 57 and then supplied to the ECU 52.

ECU 52 reads out from the memory 53 the encrypted key corresponding to the inquiry signal, encrypts an inquiry code in the inquiry signal so as to create a response signal, and then supplies the created response signal to the transmission unit 55.

The response signal that has been supplied to the transmission unit 55 is modulated in the transmission unit 55 and then transmitted, as a signal having a frequency of, e.g., 315 MHz, to the in-vehicle apparatus 10 through the transmission antenna 56.

Additionally, signals such as a LOCK key/UNLOCK key signal, for performing door remote lock/unlock operation as one of the keyless entry functions, and the like are provided; these signals are inputted from an operation detection unit 51 to ECU 52.

Figure 4:
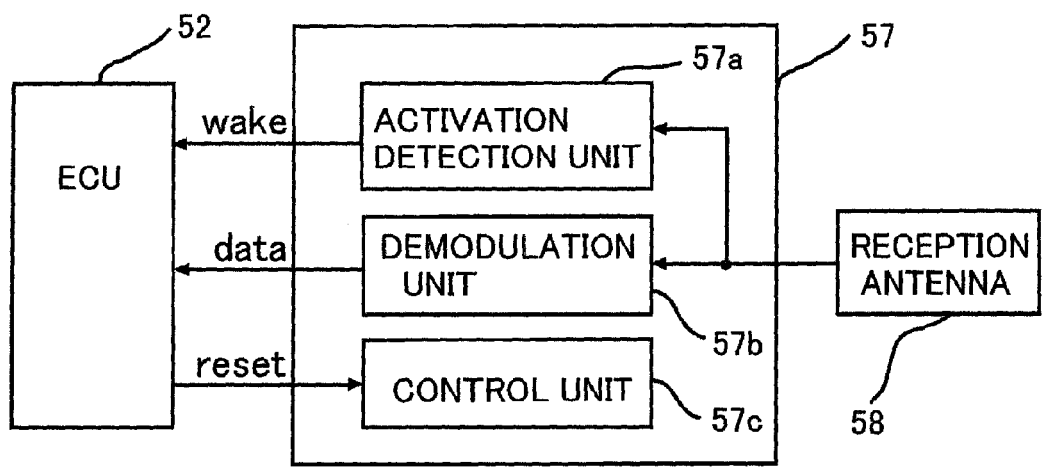
FIG. 4 is a block diagram illustrating the internal configuration of the reception unit in the mobile apparatus illustrated in FIG. 3.

FIG. 4 is a block diagram illustrating the internal configuration of the reception unit 57 in the mobile apparatus 50 illustrated in FIG. 3; in FIG. 4, the status of the connections among the blocks (i.e., an activation detection unit 57a, a demodulation unit 57b, and a control unit 57c), ECU 52, and the reception antenna 58 is illustrated.

FIG. 5, described in detail later, is a set of charts representing configuration examples of an authentication-use inquiry signal and a presence-check inquiry signal, respective response signals corresponding to these inquiry signals, and a remote control signal.

As illustrated in FIG. 4, the reception unit 57 is configured with the activation detection unit 57a, the demodulation unit 57b, and the control unit 57c.

In the case where the level of the component of a predetermined frequency in the preamble portion of each of the signals (represented in FIGS. 5(a) and 5(c)) received through the antenna 58 becomes the same as or higher than the demodulatable level, the activation detection unit 57a outputs a wake-up signal (i.e., an activation signal) to ECU 52.

In addition, FIGS. 5(a) and 5(c) represent the configuration of the presence-check inquiry signal and the configuration of the authentication-use inquiry signal, respectively.

The demodulation unit 57b demodulates the code portion after the preamble and then outputs the data signal to ECU 52.

When receiving a reset signal from ECU 52, the control unit 57c resets the activation detection unit 57a in preparation for the next reception.

As described above, FIG. 2 is a set of views symbolically illustrating the arrangement state of the in-vehicle transmission antennas and the out-vehicle transmission antennas and the status of the communication between the foregoing antennas and a mobile apparatus 50; as a method (intended party authentication method) of ascertaining whether or not the mobile apparatus 50 is an authentic registered apparatus, there exists, for example, a so-called challenge-response method (secret-key-cryptograph-base intended party authentication method).

The challenge-response method (secret-key-cryptograph-base intended party authentication method) will be explained below.

In FIG. 2, the transmission antennas (i.e., the first and second in-vehicle transmission antennas 11a and 11b and the first to fourth out-vehicle transmission antennas 12a to 12d) transmit inquiry signals having a frequency of 125 KHz; when receiving the inquiry signal, the mobile apparatus 50 transmits a response signal, having a frequency of 315 MHz, which obtained through a modulation with a response code (a cryptographic message) created from the encrypted key and the inquiry code (plain message) corresponding to the received inquiry signal.

The signal having a frequency of 315 MHz that has been received by the reception antenna 18 of the in-vehicle apparatus 10 is demodulated in the reception unit 19 and then supplied to the ECU 20; ECU 20 receives the response signal.

The in-vehicle apparatus 10 compares the cryptographic message created from the transmitted inquiry code (plain message), by use of the corresponding encrypted key, with the received response code so as to ascertain whether or not the mobile apparatus is an authentic registered apparatus.

As the signal transmitted from each of the transmission antennas (the first and second in-vehicle transmission antennas 11a and 11b and the first to fourth out-vehicle transmission antennas 12a to 12d) of the in-vehicle apparatus 10 to the mobile apparatus 50, a low-frequency wave (abbreviated as an "LF") is utilized.

The reason why an LF is utilized is that the magnetic-field components, of an electromagnetic wave, whose intensity is in inverse proportion to the distance raised to the third power is utilized so that the position of the mobile apparatus 50 is readily recognized; in general, the communication distance is approximately 1 m. In contrast, in the communication between the mobile apparatus 50 and the reception antenna 18 of the in-vehicle apparatus 10, a UHF-band electromagnetic wave is utilized; in general, the communication distance is approximately 5 m to 20 m.

In addition, as the remote control signal in the case where a keyless entry is carried out in which, by pressing a manipulation button provided in the mobile apparatus 50, the lock/unlock of the vehicle doors is controlled, a rolling code is set instead of the response code, as represented in FIG. 5(e).

The rolling code is a value which is counted up each time the mobile apparatus transmits an electric wave; the in-vehicle apparatus stores a rolling code included in a predetermined code most previously received from the mobile apparatus, and in the case where the value of the presently received rolling code included in the predetermined code is within a predetermined range of the value of the most previously received rolling code, the in-vehicle apparatus determines that the present rolling code is correct and performs control in accordance with a control code that commands the lock/unlock of the doors and the like.

Figure 6A:
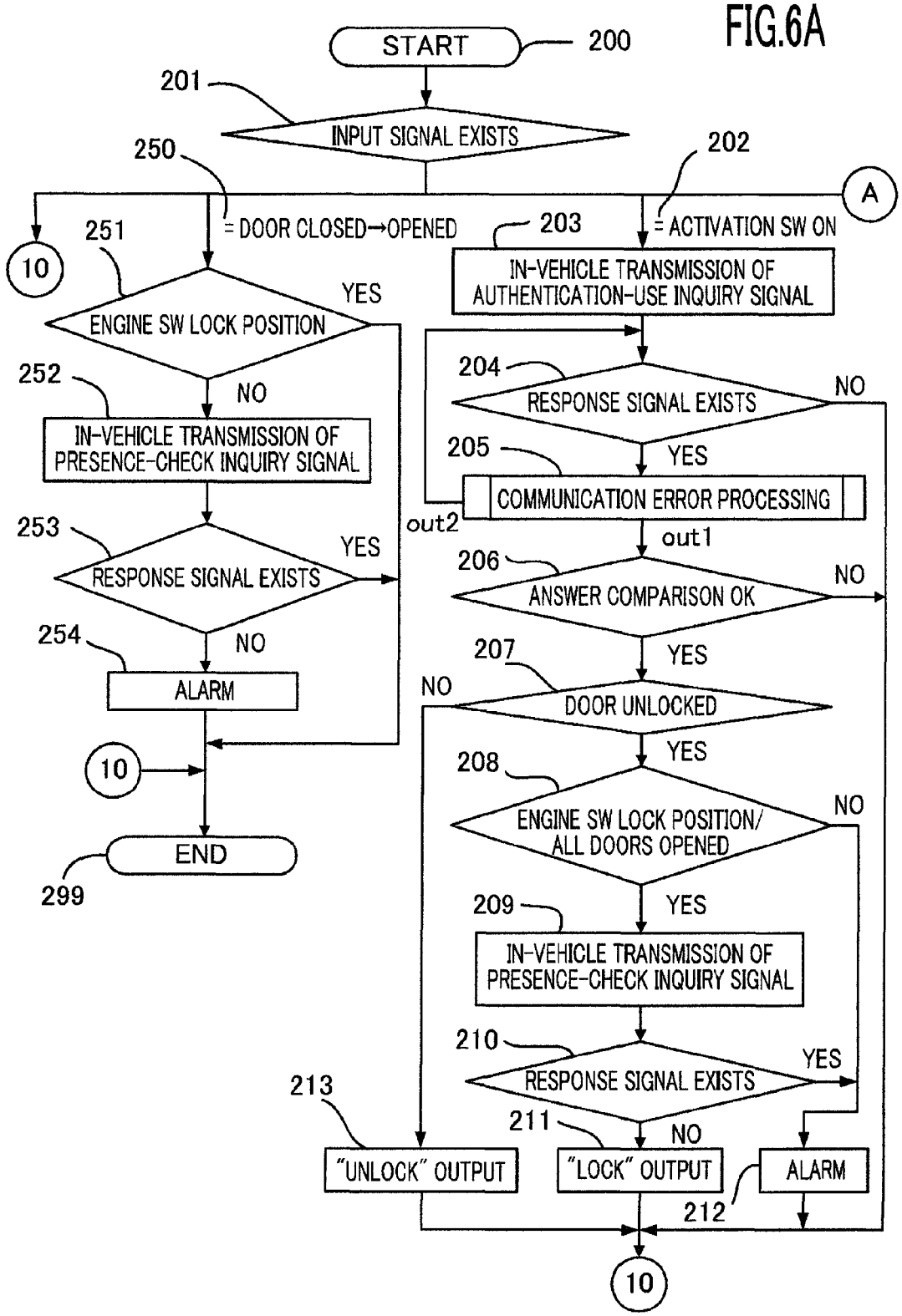

FIGS. 6A and 6B configure a flowchart for explaining the operation of ECU 20 in the in-vehicle apparatus 10 according to Embodiment 1 when the in-vehicle apparatus 10 performs communication with the mobile apparatus 50.

Figure 7:
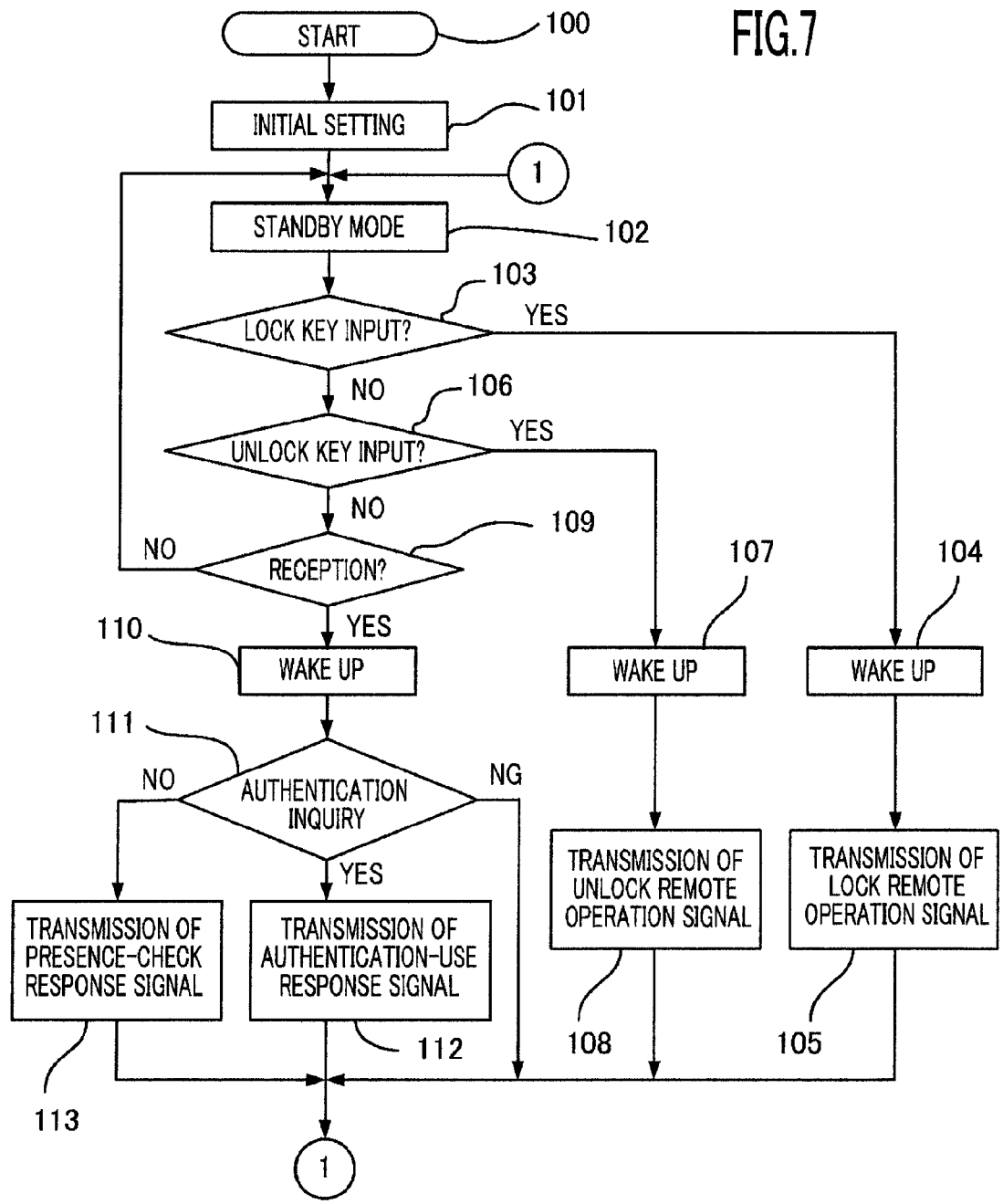
FIG. 7 is a flowchart for explaining the operation of ECU in the mobile apparatus according to Embodiment 1.

FIG. 7 is a flowchart for explaining the operation of ECU 52 in the mobile apparatus 50 according to Embodiment 1.

In addition, the operation of ECU 52 will be explained in detail later, with reference to the flowchart in FIG. 7.

Additionally, FIG. 8 is a table representing main functions realized by the controls to be explained with reference to the flowcharts illustrated in FIGS. 6A and 6B and FIG. 7; in the table, the roles of communication in the smart entry/start system are represented.

In FIG. 6A, the step 200 is a start program that is implemented when, after ECU 20 is activated, the activation SW (SW: switch), the key-knob SW, or the engine switch, which is set at the Ignition (IG)-ON position (referred to as "IG-ON", hereinafter), turns ON, or when the driver's door is opened.

In the step 201, it is determined with which condition out of the foregoing conditions the present condition coincides.

In the case where the activation SW is ON (the step 202), the out-vehicle antenna (e.g., the first out-vehicle transmission antenna when the outer-handle activation SW at the front right door is ON) corresponding to the activation switch being activated transmits an authentication-use inquiry signal.

In the step 204, it is determined whether or not a reply for the inquiry signal has been transmitted.

In the case where no reply has been transmitted, ECU 20 ends its operation in the step 299; in the case where a reply has been transmitted, ECU 20 implements the communication error check on the response signal in the step 205.

FIG. 9 is a detailed flowchart for the step 205 (communication error processing) illustrated in FIG. 6A.

As illustrated in FIG. 9, in the case where it is determined in the step 301 that there exists a communication error, the same out-vehicle antenna retransmits the inquiry signal in the step 302, and the step 204 of the flowchart in FIG. 6A is resumed.

In the flowchart in FIG. 6A, in the case where it is determined in the step 205 that there exists no communication error, the content of the response signal for the inquiry signal is checked in the step 206, and in the case where the reply is incorrect, ECU 20 ends its operation in the step 299.

In the case where the reply is correct, it is determined in the step 207 whether or not the doors are in the unlock state. In the case where the doors are in the lock state, ECU 20 commands, in the step 213, the door unlock output to be issued and ends its operation in the step 299. In the case where the doors are in the unlock state, it is determined in the step 208 whether or not the engine switch is at the Lock position and all the doors are closed (condition 1).

In the case where the condition 1 is satisfied, each of all the in-vehicle antennas transmits a presence-check inquiry signal in the step 209, and in the case where it is determined in the step 210 that the mobile apparatus is not inside the vehicle (there exists no reply), ECU 20 commands the door lock output to be issued in the step 211 and ends its operation in the step 299.

In the case where the condition 1 is not satisfied, or in the case where it is determined in the step 210 that there exists a response, ECU 20 commands, in the step 212, the alarm output to be issued so as to notify that the lock operation cannot be carried out and ends its operation in the step 299.

In the case where the key-knob SW is ON (the step 220), each of all the in-vehicle antennas transmits an authentication-use inquiry signal in the step 221.

In the step 222, it is determined whether or not a response signal for the inquiry signal has been transmitted. In the case where no response signal has been transmitted, ECU 20 ends its operation in the step 299.

In the case where a response signal has been transmitted, ECU 20 implements the communication error check on the response signal in the step 223, and in the case where there exists a communication error, the inquiry signals are retransmitted and the step 222 is resumed.

In the case where it is determined in the step 223 that there exists no communication error, the content of the response signal for the inquiry signal is checked in the step 224, and in the case where the transmitted response is incorrect, ECU 20 ends its operation in the step 299.

In the case where the reply is correct, ECU 20 commands, in the step 225, the engine-switch lock release output to be issued and ends its operation in the step 299.

In the case where IG is ON (in the step 230), each of the in-vehicle antennas transmits the authentication-use inquiry signal in the step 230.

In the step 232, it is determined whether or not a response signal for the inquiry signal has been transmitted.

In the case where no response signal has been transmitted, ECU ends its operation in the step 299; in the case where a response signal has been transmitted, ECU 20 implements the communication error check on the response signal in the step 233, and in the case where there exists a communication error, the inquiry signals are retransmitted and the step 232 is resumed.

In the case where it is determined in the step 233 that there exists no communication error, the content of the response signal for the inquiry signal is checked in the step 234, and in the case where the reply is incorrect, ECU 20 ends its operation in the step 299.

In the case where the reply is correct, ECU 20 outputs the engine activation permission in the step 236 and ends its operation in the step 299.

In the case where the door is closed (the step 250), it is determined in the step 251 whether or not the engine switch is at the Lock position, and in the case where it is determined that the engine switch is at the Lock position, ECU ends its operation in the step 299.

In the case where the engine switch is not at the Lock position, each of all the in-vehicle antennas transmits the presence-check inquiry signal in the step 252. In the step 253, it is determined whether or not a response signal for the inquiry signal has been transmitted.

In the case where a response signal has been transmitted, ECU 20 ends its operation in the step 299. In the case where no response signal has been transmitted, ECU 20 commands an alarm to be outputted in order to notify that the mobile apparatus has been taken out and ends its operation in the step 299.

The communication error processing in each of the steps 205, 223, and 233 is the same processing; as described above, FIG. 9 is a detailed flowchart of the communication error processing.

In FIG. 9, in the case where it is determined in the step 301 that there exists a communication error, the same out-vehicle antenna retransmits the inquiry signal in the step 302.

In the case of Embodiments 3 and 4 described later, in the foregoing retransmission, only the mobile apparatus that has an identification code the same as an addition code described later to be received and demodulated is designated by ECU 20 to transmit the response signal.

In addition, in the case of Embodiment 5 described later, it is not required to designate any mobile apparatus that transmits the response signal.

Additionally, there exist two methods for the detection, in the step 301, of a communication error; in the first method, the detection is performed in a binary encoding calculation unit 930.

In the second method, the detection is performed through the check utilizing an error detection code (CRC code) included in the response information.

As described above, FIG. 5 is a set of charts representing configuration examples of the authentication-use inquiry signal and the presence-check inquiry signal, respective response signals corresponding to these inquiry signals, and the remote control signal.

FIG. 5(*a*) represents the configuration of the presence-check inquiry signal; the presence-check inquiry signal is configured with a preamble (e.g., a burst signal of approximately 2 ms), a fixed ID code (e.g., 20 bits) formed of a fixed-length ID information, an addition code (e.g., 4 bits) including the identification information of a mobile apparatus to respond, and, e.g., CRC (cyclic redundancy checksum)-method code (e.g., 10 bits) as error control information.

FIG. 5(*b*) represents the configuration of a presence-check response signal; the presence-check response signal is configured with the identification code (e.g., 10 bits) of a mobile apparatus, a fixed ID code, and a CRC code.

FIG. 5(*c*) represents the configuration of the authentication-use inquiry signal; the authentication-use inquiry signal is configured with a preamble, a fixed ID code, an identification code including the identification information of a mobile apparatus to respond, a plain-message inquiry code (e.g., 32 bits) randomly created every time, and a CRC code.

FIG. 5(*d*) represents the configuration of an authentication-use response signal; the authentication-use response signal is configured with the identification code of a mobile apparatus, a fixed ID code, bits that imply a response signal, a response code as a cryptographic message obtained by encrypting a received inquiry code by use of an encrypted key, and a CRC code.

FIG. 5(*e*) represents the configuration of the remote control signal; the remote control signal is configured with an identification code including information for identifying a mobile apparatus and information for implying the remote control signal, a fixed ID code, a remote operation code, a rolling code, and a CRC code.

Next, the operation of the mobile apparatus 50 will be explained based on the flowchart in FIG. 7.

In the case where ECU 52 in the mobile apparatus 50 starts its operation by being reset due to battery replacement or the like, the flow starts from "START" (step 100); the initial setting of ECU 52 is performed in the step 101; then, ECU 52 comes into the standby mode in the step 102.

In the case where it is determined in the step 103 that there has been the LOCK key input, ECU 52 wakes up (in the step 104) and transmits a LOCK signal, which is a remote operation signal (in the step 105).

After the transmission, the step 102 is resumed.

In the case where it is determined in the step 103 that there has not been the LOCK key input, the step 103 is followed by the step 106.

In the case where it is determined in the step 106 that there has been the LOCK key input, ECU 52 wakes up (in the step 107) and transmits an UNLOCK signal, which is a remote operation signal (in the step 108).

After the transmission, the step 102 is resumed.

In the case where it is determined in the step 106 that there has not been the UNLOCK key input, the step 106 is followed by the step 109.

In the case where it is determined in the step 109 that a signal from the in-vehicle apparatus 10 has been received (an LF has been received), ECU 52 wakes up (in the step 110) and determines in the step 111 whether or not the received signal is the presence-check inquiry signal. In the case where the received signal is not the presence-check inquiry signal, ECU 52 generates the response code in the step 112, based on the received inquiry code and transmits the authentication-use response signal; after the transmission, the step 102 is resumed.

In the case where it is determined in the step 111 that the received signal is the presence-check inquiry signal, ECU 52 transmits the presence-check response signal, and the step S102 is resumed.

In the case where it is determined in the step 111 that the reception content implies that no reply is required (e.g., in the case where the reception content is a reply request to another mobile apparatus), the step 102 is resumed.

FIG. 10 is a block diagram illustrating in detail the configuration of the transmission unit 55 (refer to FIG. 3) of the mobile apparatus 50 according to Embodiment 1.

FIG. 11 is a block diagram illustrating in detail the configuration of the reception unit 19 (refer to FIG. 1) of the in-vehicle apparatus 10 according to Embodiment 1.

FIG. 12 is a signal timing chart for explaining an example of the operation of the in-vehicle apparatus remote control system according to Embodiment 1.

In the first place, the operation of the transmission unit 55 of the mobile apparatus 50 will be explained in detail, with reference to FIGS. 10 and 12.

In the duration in which a binary ("0" and "1") transmission data 520 for the response signal and the remote control signal that are generated in the ECU 52 is "0" in FIG. 12(a), a spread code (PN0) 550 generated in a PN code generator 55a in the transmission unit 55 is selected in a primary modulator 55c, and in the duration in which the binary transmission data 520 is "1", a spread code (PN1) 551 generated in a PN code generator 55b is selected, so that a primary modulated signal 552 (refer to FIG. 12(b)), which is a direct spread spectrum signal, is generated.

A secondary modulated signal 553 is generated by modulating, in a modulation unit 55d, a carrier wave through phase-shift keying (PSK; refer to FIG. 12), or frequency-shift keying (FSK), with the primary modulated signal 552, amplified in a amplification unit 55e, and transmitted as an electric wave through the antenna 56.

Figure 13:
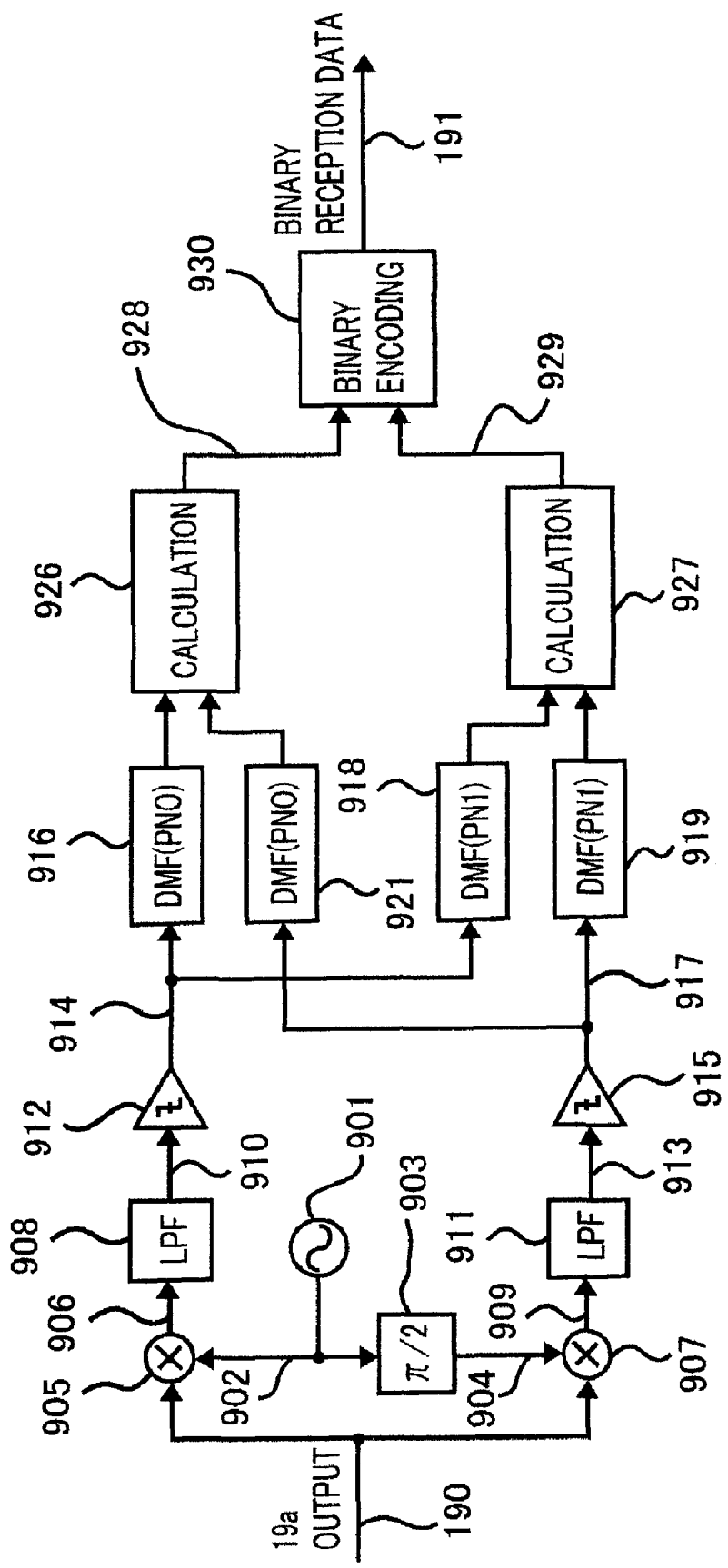
FIG. 13 is a block diagram for explaining the operation of the demodulation unit of the reception unit in the in-vehicle apparatus illustrated in FIG. 11.

FIG. 13 is a block diagram for explaining the operation of a demodulation unit 19b in the reception unit 19, illustrated in FIG. 11, of the in-vehicle apparatus; FIG. 13 is a block diagram for explaining the operation of a demodulation unit 19b in the reception unit 19 in the case where the phase-shift keying (PKS) is performed in the modulation unit 55d of the transmission unit of the mobile apparatus 50.

The operation of the reception unit 19 of the mobile apparatus 10 will be explained with reference to FIGS. 11, 12, and 13.

A signal received through the antenna 18 is amplified in an amplification unit 19a of the reception unit 19, demodulated in the demodulation unit 19b into binary communication data 191, and then transmitted to ECU 20.

In FIG. 13, an oscillator 901 generates a local oscillation signal 902 of a frequency the same as that of the secondary modulated signal 553 generated in the transmission unit 55.

A π/2 phase shifter 903 is a circuit unit for shifting the phase of the local oscillation signal 902 by 90°.

Mixers 905 and 907 are circuit units (multipliers) for multiplying a reception signal 190 by local oscillation signals 902 and 904, respectively, each of which is perpendicular to the reception signal 190, so as to frequency-convert the reception signal 190 into a signal whose frequency is lower than that of the carrier wave.

Outputs 906 and 909 of the mixers 905 and 907 are referred to as I component and q component, respectively.

Low-pass filters (LPFs) 908 and 911 are filters that each transmit signal components whose frequencies are lower than the chip rates (1/Tc) of spread codes ak and bk.

The mixers 903 and 904 each function as a quadrature detection means.

Comparators 912 and 915, which are A/D converters for so-called hard determination, are circuit units that each determine the LPF output signal with a predetermined level so as to perform PSK demodulation (refer to FIG. 12(e)).

Digital matching filter (DMF) 916 (or 921), which is a unit for performing reverse spread processing of the PN code PN0, is a circuit unit (refer to FIG. 12(f)) that performs correlation evaluation by making a sum-total calculation (refer to Equation (1)) of the exclusive logical sum of a PSK demodulated signal (c(t)) 914 (or 917) and the spread signal ak (or bk), in steps of a chip (Tc) over the one-bit length (Tb=Tc×Nc) of the information, and outputs the correlation value (the sum total).

Similarly, digital matching filter (DMF) 918 (or 919), which is a unit for performing reverse spread processing of the PN code PN1, is a circuit unit (refer to FIG. 12(e)) that makes a sum-total calculation (refer to Equation (2)) and outputs a correlation value.

$$\sum_{k=0}^{N_c-1} \{c(t-kT_c) \oplus a_{6-k}\} \quad (1)$$

$$\sum_{k=0}^{N_c-1} \{c(t-kT_c) \oplus b_{6-k}\} \quad (2)$$

Here, Equations (1) and (2) represent the correlation values of PN0 and PN1, respectively.

A calculator 926 (or 927) selects one, out of the I and Q components, whose correlation level is higher than a predetermined correlation level (correlation threshold value) and higher than that of the other (the sum total of which is smaller than that of the other).

The binary encoding calculation unit 930 compares the PN0 correlation value with the PN1 correlation value so as to select one, out of them, whose correlation level is higher than that of the other (the sum total of which is smaller than that of the other), and outputs a binary value corresponding to the selected correlation value (in the case where the correlation level of the PN0 is higher than that of the PN1, "0" is outputted, and in the case where the correlation level of the PN1 is higher than that of the PN0, "1" is outputted) (refer to FIG. 12(g)).

Because the chip phases of the transmission side and the reception side are not in synchronization with each other, the reverse spread processing in each of the digital matching filters (DMFs) 916, 921, 918, and 919 may not be able to detect the correlation peak, through the correlation-value calculation in steps of Tc; therefore, it is preferable that the correlation calculation is performed at two kinds of intervals (Tc) that are shifted by Tc/2 from each other, and one, out of PN0 and PN1, whose correlation is higher than that of the other is adopted.

In addition, each of "1" and "0" in FIG. 12(a) that represents the waveform of binary transmission data is a bit, and each of "1" and "0" in FIG. 12(b) is a chip. In this example, one bit consists of seven chips.

As described above, the in-vehicle apparatus remote control system according to Embodiment 1 includes a transmission means (the transmission unit 17 and the in-vehicle transmission antenna 11), of the in-vehicle apparatus 10, for transmitting an authentication-use inquiry signal and a presence-check inquiry signal to a plurality of mobile apparatuses 50; a reception means (the reception unit 57 and the reception ant Emma 58), of the mobile apparatus 50, for receiving the inquiry signal; a transmission means (the transmission unit 55 and the transmission ant Emma 56), of the mobile apparatus 50, for receiving the inquiry signal and then transmitting a response signal to the in-vehicle apparatus 10; a reception means (the reception unit 19 and the reception antenna 18), of the in-vehicle apparatus 10, for receiving the response signal transmitted from the transmission means of the mobile apparatus 50; and an operation control means (ECU 20) for controlling the operation states of in-vehicle devices (e.g., the engine control unit 32, the steering lock unit 32, the door lock unit 36, and the like) when the response code in the response signal transmitted to the in-vehicle apparatus 10 has been compared. The transmission means of the mobile apparatus 50 converts the response signal into binary data, modulates a carrier wave with a digital signal obtained through modulation by a plurality of pseudo-random codes corresponding to the binary data, and then transmits the response signal; the reception means of the in-vehicle apparatus 10 evaluates the correlation of the received response signal by use of a plurality of correlators corresponding to the plurality of pseudo-random codes and demodulates the response signal, based on the outputs of the plurality of correlators; the transmission means of the in-vehicle apparatus 10 retransmits the inquiry signal to the mobile apparatus 50 when there has been outputs from the plurality of correlators within a predetermined time (e.g., a time corresponding to an approximately one-chip duration) of the occurrence of the pseudo-random code.

According to Embodiment 1, a plurality (e.g., two kinds) of PN codes are utilized, and the reception means of the in-vehicle apparatus performs reverse spread processing by use of a plurality (e.g., two kinds) of correlators; therefore, unlike the conventional technology set forth in Patent Document 4 (National Publication of International Patent Application No. 2003-500957), it is not required that as many correlators as the number of the mobile apparatuses are provided, whereby an effect is demonstrated in which an in-vehicle apparatus remote control system can be formed by means of a small-scale circuit and at low cost.

Because the direct spread modulation method (M-ary/DS modulation method) is adopted in which two kinds of information bits ("0" and "1") are allocated to corresponding two kinds of PN codes, communication conflict among the mobile apparatuses can readily be detected even in the case where the method of multiplexing through phase shift, which is a scheme for receiving almost at the same time replies from the mobile apparatuses, is not perfectly carried out; therefore, a high-reliability in-vehicle apparatus remote control system can be realized.

In other words, according to Embodiment 1, an in-vehicle apparatus remote control system can be realized in which the responsiveness can be enhanced through multiplex communication and the reliability of communication is high, and that is small-sized, inexpensive, and suitable for preventing unauthorized use and theft of a vehicle.

Moreover, according to Embodiment 1, the response signal from the transmission means of the mobile apparatus includes a communication-error detection code; the reception means of the in-vehicle apparatus has a communication-error detection means for determining by use of the communication-error detection code whether or not there exists a communication error; the transmission means of the in-vehicle apparatus retransmits the inquiry signal to the mobile apparatus when the communication-error detection means detects a communication error.

Still moreover, as described above, in the case where a communication error is detected, the inquiry signal is retransmitted; therefore, an in-vehicle apparatus remote control system can be realized in which high-reliability communication can be performed.

Furthermore, according to Embodiment 1, the carrier-wave modulation in the transmission means of the mobile apparatus is performed through the frequency-shift keying or the phase-shift keying, and the reception means of the in-vehicle apparatus performs quadrature detection, reverse spread processing, and then demodulation of the response signal; therefore, a small-sized and inexpensive in-vehicle apparatus remote control system can be realized, with a small-scale circuit, in which the responsiveness can be enhanced through multiplex communication and the reliability of communication is high.

Moreover, according to Embodiment 1, because the carrier-wave frequency in the transmission means of the in-vehicle apparatus is in the LF band (in general, 125 KHz), the communication area is limited and the number of responding mobile apparatuses is reduced; thus, the occurrence probability of interference among the mobile apparatuses can further be reduced.

The in-vehicle apparatus remote control method according to Embodiment 1 includes a transmission step in the in-vehicle apparatus 10, of transmitting an authentication-use inquiry signal and a presence-check inquiry signal to a plurality of mobile apparatuses 50; a reception step in the mobile apparatus 50, of receiving the inquiry signals; a transmission step in the mobile apparatus 50, of receiving the inquiry signal and then transmitting a response signal to the in-vehicle apparatus 10; a reception step in the in-vehicle apparatus 10, of receiving the response signal transmitted in the transmission step in the mobile apparatus 50; and an operation control step of controlling the operation states of in-vehicle devices when the response code in the response signal transmitted to the in-vehicle apparatus 10 has been compared. In the transmission step in the mobile apparatus 50, the response signal is converted into binary data, a carrier wave is modulated with a digital signal obtained through modulation by a plurality of pseudo-random codes corresponding to the binary data, and then the response signal is transmitted; in the reception step in the in-vehicle apparatus 10, the correlation of the received response signal is evaluated by use of a plurality of correlators corresponding to the plurality of pseudo-random codes and the response signal is demodulated based on the outputs of the plurality of correlators; in the transmission step in the in-vehicle apparatus 10, the inquiry signal is retransmitted to the mobile apparatus 50 when there has been outputs from the plurality of correlators within a predetermined time of the occurrence of the pseudo-random code.

Therefore, according to Embodiment 1, an in-vehicle apparatus remote control method can be realized in which the responsiveness can be enhanced through multiplex communication and the reliability of communication is high, and that is small-sized, inexpensive, and suitable for preventing unauthorized use and theft of a vehicle.

Embodiment 2

Figure 14:
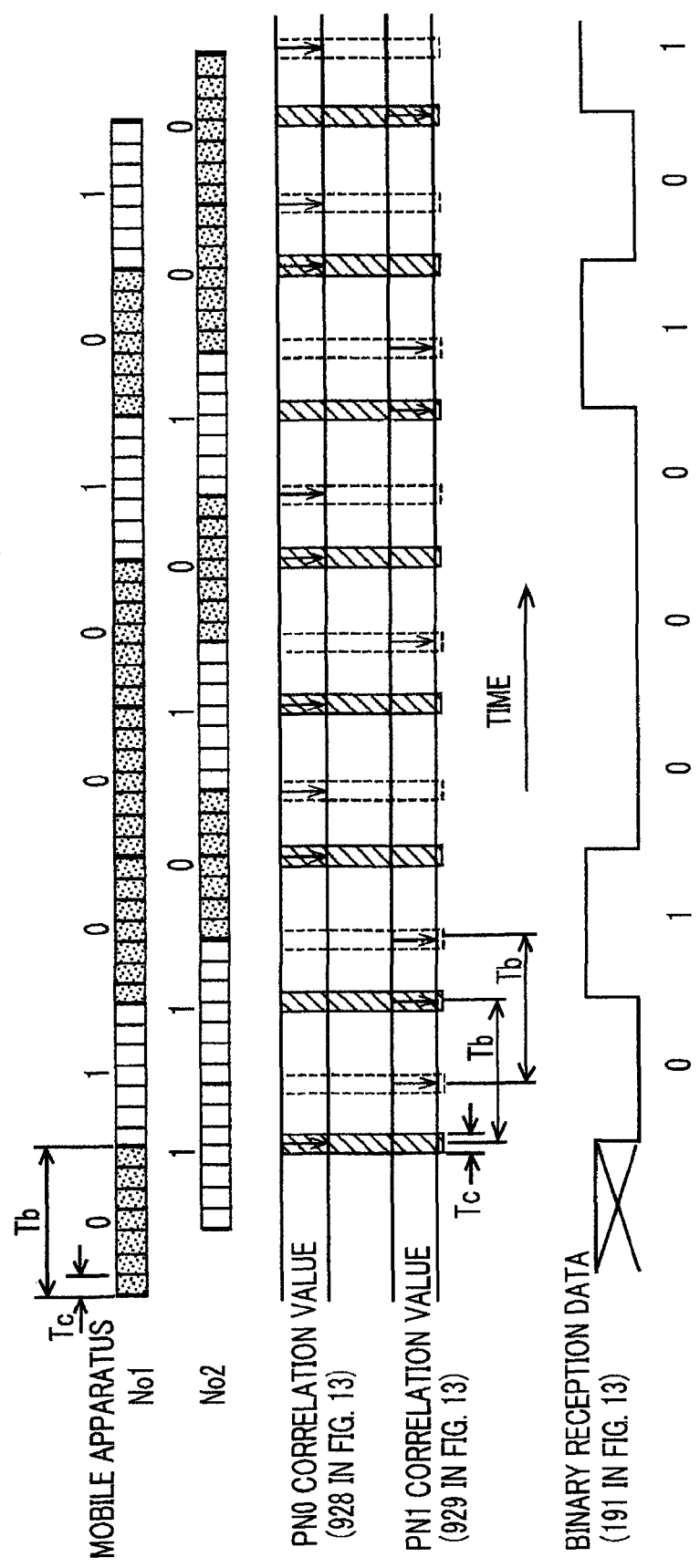
FIG. 14 is a timing chart for explaining the operation of the demodulation unit of the reception unit in an in-vehicle apparatus remote control system according to Embodiment 2.

FIG. 14 is a timing chart for explaining the operation of the demodulation unit, which is a principal constituent element of the reception unit in the in-vehicle apparatus remote control system according to Embodiment 2; moreover, FIG. 14 is a chart for explaining the generation of the binary reception data 191 as the output of the demodulation unit 19b, in the case where signals from a plurality of mobile apparatuses (e.g., mobile apparatus No. 1, mobile apparatus No. 2, and the like) are received.

As represented in FIG. 14, a PN0 correlation value 928 that satisfies the transmission-correlation threshold value corresponding to binary transmission data from mobile apparatus No. 1 is outputted, and then a PN1 correlation value 929 that satisfies the transmission-correlation threshold value corresponding to binary transmission data from mobile apparatus No. 2 is outputted.

In this case, only the signal, corresponding to mobile apparatus No. 1, which firstly appears at a time interval Tb from the first signal is selected and outputted as binary reception data.

In a smart entry/start system, as represented in FIG. 8, when the in-vehicle apparatus can establish communication with any one of the mobile apparatuses, a control logic comes into effect; therefore, even in the case where a plurality of signals from a plurality of mobile apparatuses is received, it is not required that a plurality of received data pieces is demodulated.

In Embodiment 2, only one reception data piece that appears firstly is selected and outputted; therefore, the in-vehicle apparatus remote control system according to Embodiment 2 has an advantage that, because the communication system connecting the reception unit 19 of the in-vehicle apparatus with ECU 20 is simplified, for example, a plurality of communication lines, a transmission buffer, a serial-parallel converter are not required, not only the in-vehicle apparatus remote control system can be realized with an inexpensive and simple circuit, but also the communication time is shortened.

In FIG. 14, in the case where the phases of mobile apparatus No. 1 and mobile apparatus No. 2 approximately coincide with each other with tolerance of ±Tc/2 (i.e., there exist effective outputs of the PN0 correlation value 928 and the PN1 correlation value 929 within the chip length of Tc), in general, the outputs of the PN0 correlation value 928 and the PN1 correlation value 929 cannot be demodulated as binary reception data; therefore, the binary encoding calculation unit 918 determines that a communication error is caused and outputs communication-error information.

That is to say, in Embodiment 2, the data that the reception unit receives, demodulates, and transmits to ECU is limited to data from only one mobile apparatus; therefore, even though the input of the reception unit is configured in such a way as to receive multiplex data, the output portion of the reception unit is configured as a single-data communication circuit for outputting necessary and satisfactory information required by the system.

Accordingly, because a plurality of communication circuits, as described in National Publication of International Patent Application No. 2003-500957, that communicates with ECU 20 is not included in the system, the system can be realized with an inexpensive and small-scale circuit.

As described above, in the in-vehicle apparatus 10 according to Embodiment 2, only the response signal, out of response signals, which is firstly demodulated by the reception means of the in-vehicle apparatus 10 is transmitted; therefore, not only the circuit scale of the reception means of the in-vehicle apparatus 10 is reduced, but also the communication time is shortened. Moreover, the system has an advantage that, because the amount of communication with ECU 20 is reduced, the circuit scale is also decreased.

Embodiment 3

Figure 15:
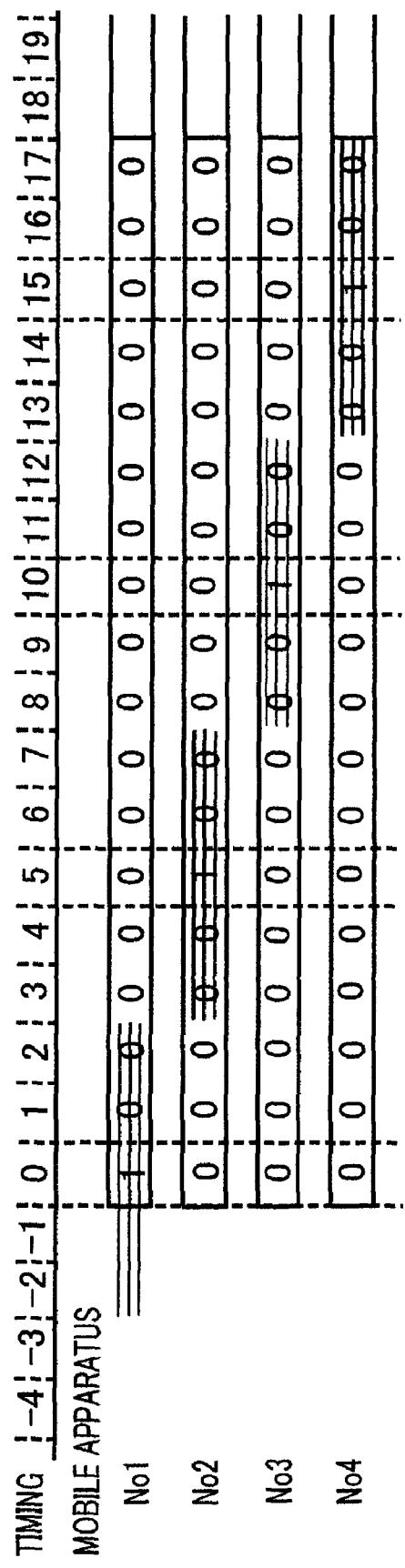
FIG. 15 is a chart for explaining the distinguishing operation of an in-vehicle apparatus remote control system according to Embodiment 3.

FIG. 15 is a chart for explaining the distinguishing operation of an in-vehicle apparatus remote control system according to Embodiment 3; FIG. 15 represents identification codes provided at the foremost positions of the response signals from a plurality of mobile apparatuses (e.g., mobile apparatuses No. 1 to 4).

These identification codes are provided in order to prevent a communication error even when the phases of the information bits transmitted from mobile apparatuses No. 1 to 4 coincide with one another.

FIG. 15 represents a case where, in the four mobile apparatuses, the management accuracy of the response signal transmission timing is approximately ±2 information bits; the mobile apparatus identification codes are each configured with 18 bits; each of the mobile apparatuses is identified by the bit position of the sole "1"; the respective bit positions of "1"s are arranged in such a way as not to overlap with one another even when the bit positions shift ±2 bits, which is the timing management limit.

In addition, in each of the mobile apparatus identification codes represented in FIG. 15, three horizontal lines are put on the range of 5 bits with respect to "1"; this indicates that, because the manageable accuracy of the transmission timing of each mobile apparatus is higher than ±2 bits, the information bit "1" in the mobile apparatus identification code does not overlap with the information bit "1" of another mobile apparatus.

Additionally, in the case where there exists a communication error, i.e., in the case where the PN0 and PN1 correlators each output an effective output within Tc, the output of the PN1 correlator is selected.

As a result, because the information items of these identification codes are protected, the one, out of the mobile apparatuses, which transmits the response signal can be determined, even though a communication error is caused; therefore, only the determined mobile apparatus is required to retransmit the inquiry signal, whereby, as a system, communication with a mobile apparatus can be established.

In addition, it is evident that, in the case where "1" and "0" in the identification code are set in a reversed manner, the same result can be obtained by selecting PN0 when a communication error is caused.

As described above, in the in-vehicle apparatus according to Embodiment 3, two or more mobile apparatuses each have an inherent identification number (identification code), and the time difference between the initial response signal transmission timing and the response signal transmission timing for the second inquiry signal differs depending on the identification number.

Accordingly, even though a communication error is caused by interference among a plurality of mobile apparatuses, at least the mobile apparatus, among the plurality of apparatuses, which transmits one response signal can be determined; therefore, the in-vehicle apparatus according to Embodiment 3 has an advantage that, by commanding only the foregoing mobile apparatus to transmit the response signal, a communication error in the retransmission can be avoided, whereby a high-reliability communication system can be realized.

Embodiment 4

Embodiment 4 is a variant example of Embodiment 3 described above.

Figure 16:
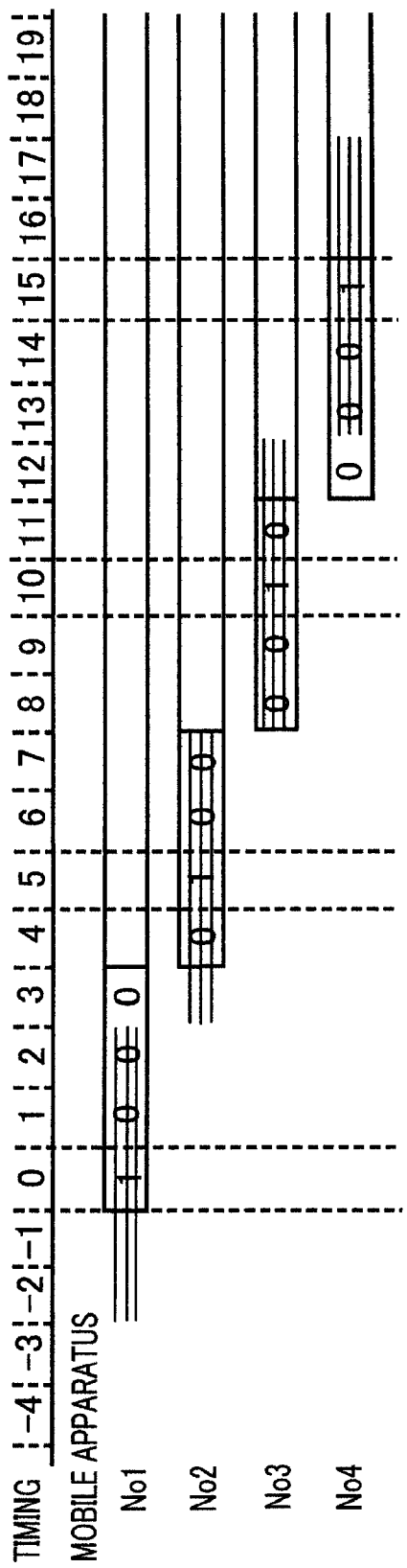
FIG. 16 is a chart for explaining the distinguishing operation of an in-vehicle apparatus remote control system according to Embodiment 4.

FIG. 16 is a chart for explaining the distinguishing operation of an in-vehicle apparatus remote control system according to Embodiment 4; FIG. 16 represents identification codes provided at the foremost positions of the response signals from a plurality of mobile apparatuses (e.g., mobile apparatuses No. 1 to 4) and the respective timings for the response signals.

In Embodiment 3 described above, each mobile apparatus has a long identification code of 18 bits.

However, in Embodiment 4, by staggering the respective response signal transmission timings for the mobile apparatuses, the same effect can be obtained with a short identification code.

As represented in FIG. 16, each mobile apparatus starts to transmit the response signal at the timing that is delayed by the duration corresponding to the number of bits, obtained by multiplying the numerical value, calculated by subtracting "1" from the inherent number of the mobile apparatus, by the timing management limit (in this case, ±2 bits=4 bits).

For example, mobile apparatus No. 3 starts the transmission at the timing that is delayed by 8 (=(3−1)×4) bits from the transmission timing of mobile apparatus No. 1.

By configuring the in-vehicle apparatus remote control system, as described above, each of the mobile apparatuses can be identified by the position of a bit of "1" in the 4-bit mobile apparatus identification code; moreover, because bits of "1" do not overlap with one another, which is the timing management limit.

Embodiment 5

Figure 17:
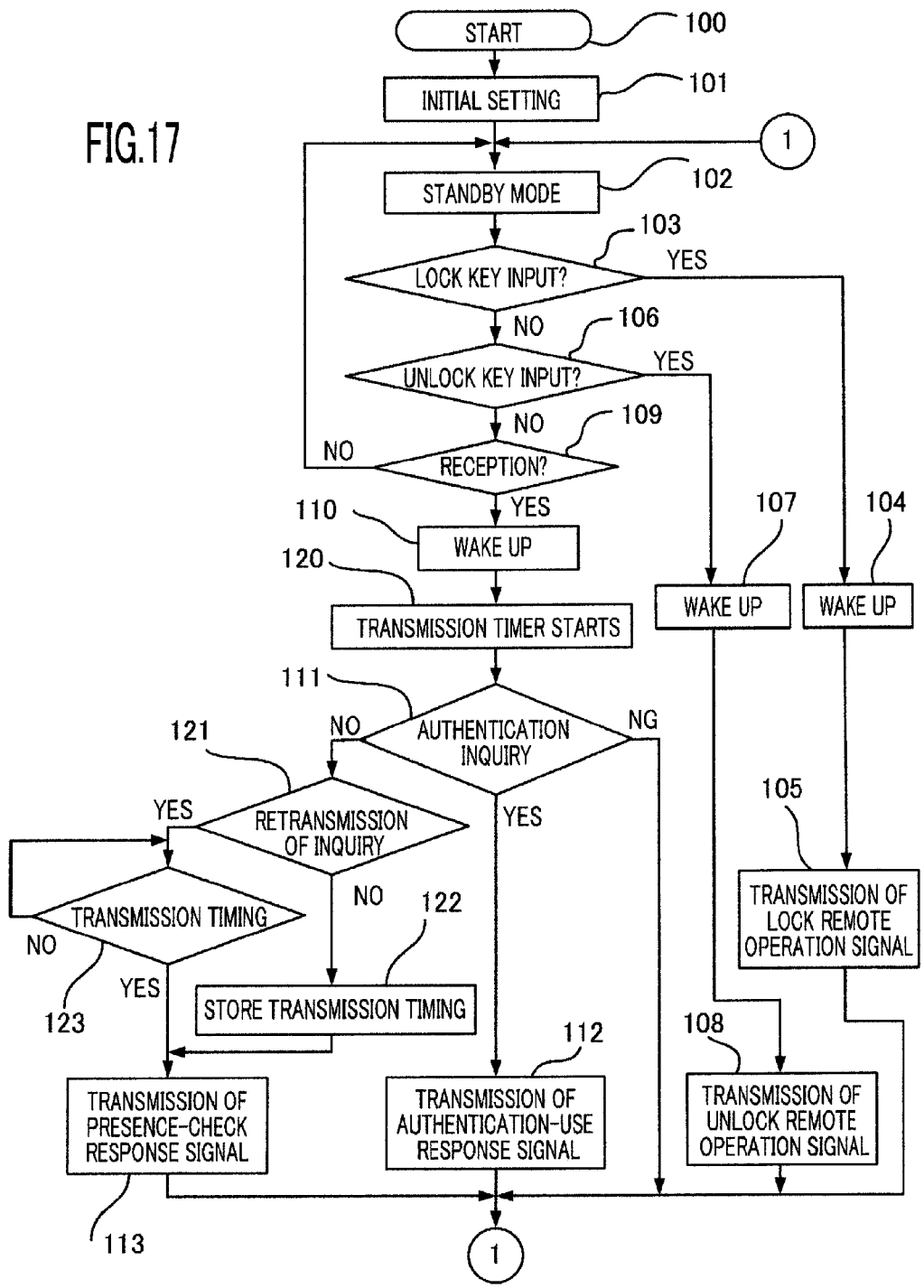
FIG. 17 is a flowchart for explaining the operation of ECU in a mobile apparatus according to Embodiment 5.

FIG. 17 is a flowchart for explaining the operation of ECU 52 in the mobile apparatus 50 according to Embodiment 5.

In Embodiment 5, measures for a communication error due to the synchronization of the phases of the information bits of mobile apparatuses are taken without depending on the identification codes of the mobile apparatuses.

Part of the operation, which is different from that in the operation flow, illustrated in FIG. 7, according to Embodiment 1 and the operation items in the steps before and after the part of the operation.

The same operation steps as those in Embodiment 1 are indicated by the same step numbers as those in FIG. 7.

When, upon the reception, waking up in the step 110, ECU 52 makes the transmission timer start in the step 120 and determines in the step 111 whether or not the received message is an authentication-use inquiry signal.

In Embodiment 5, it is determined in the step 111 whether or not the received message is an authentication-use inquiry signal; in the case where the received message is not an authentication-use inquiry signal but a presence-check inquiry signal, the step 111 is followed by the step 121.

It is determined in the step 121 whether the inquiry signal is a first one or a retransmitted one; in the case where the inquiry signal is the first one, the content of the transmission timer is stored in the step 122, and a presence-check response signal is transmitted in the step 113.

In the case where it is determined in the step 121 that the inquiry signal is a retransmitted one, it is determined in the step 123 whether or not the present timing is the transmission timing (equals to the sum of the stored previously transmitted timer value and a predetermined value).

In the case where the present timing is not yet the transmission timing, the step 123 is resumed.

When determining in the step 121 that the present timing is the transmission timing, ECU 52 transmits in the step 113 the presence-check response signal.

In Embodiment 5, the respective identification codes of a plurality of mobile apparatuses are configured in such a way that, even when the identification code of a mobile apparatus coincides with the identification code of another response signal, at least one of the identification codes can be demodulated.

As described above, in the in-vehicle apparatus according to Embodiment 5, two or more mobile apparatuses each have an inherent identification number; an identification code corresponding to the identification number is included at the foremost position of a response signal; the respective identification codes are configured in such a way that, even when the identification code of a mobile apparatus coincides with the identification code of another response signal, at least one of the identification codes can be demodulated.

As described above, in Embodiment 5, even though a communication error is caused by interference among a plurality of mobile apparatuses, at least the mobile apparatus, among the plurality of apparatuses, which transmits one response signal can be determined; therefore, the in-vehicle apparatus according to Embodiment 5 has an advantage that, by commanding only the foregoing mobile apparatus to transmit the response signal, a communication error in the retransmission can be avoided, whereby a high-reliability communication system can be realized.

Embodiment 6

FIG. 18 is a signal timing chart for explaining an example of the operation of the in-vehicle apparatus remote control system according to Embodiment 6.

The bit pattern of the signal in the timing chart represented in FIG. 18 is different from that in the timing chart in FIG. 12; because the cross-correlation between the signal and the other signals is small, an example of a more preferable bit pattern is represented.

FIG. 10 explained above is a block diagram illustrating in detail the configuration of the transmission unit 55 of the mobile apparatus 50 according to Embodiment 6; FIG. 11 explained above is a block diagram illustrating in detail the configuration of the reception unit 19 of the in-vehicle apparatus 10 according to Embodiment 6.

In the first place, the operation of the transmission unit 55 of the mobile apparatus 50 will be explained in detail, with reference to FIGS. 10 and 18.

In the duration in which the binary ("0" and "1") transmission data 520 for the response signal and the remote control signal that are generated in the ECU 52 is "0" in FIG. 18(a), the spread code (PN0) 550 generated in the PN code generator 55a in the transmission unit 55 is selected in the primary modulator 55c, and in the duration in which the binary transmission data 520 is "1", the spread code (PN1) 551 generated in the PN code generator 55b is selected, so that the primary modulated signal 552 (refer to FIG. 18(b)), which is a direct spread spectrum signal, is generated.

The secondary modulated signal 553 is generated by modulating, in the modulation unit 55d, a carrier wave through phase-shift keying (PSK; refer to FIG. 18), or frequency-shift keying (FSK), with the primary modulated signal 552, amplified in the amplification unit 55e, and transmitted as an electric wave through the antenna 56.

The operation of the transmission unit 55 of the mobile apparatus 50 and the operation of the reception unit 19 of the in-vehicle apparatus 10 in Embodiment 6 are the same as those in Embodiment 1; these operations will be explained again.

FIG. 13 explained above is a block diagram for explaining the operation of the demodulation unit 19b in the reception unit 19, illustrated in FIG. 11, of the in-vehicle apparatus; FIG. 13 is a block diagram for explaining the operation of the demodulation unit 19b in the reception unit 19 in the case where the phase-shift keying (PKS) is performed in the modulation unit 55d of the transmission unit of the mobile apparatus 50.

The operation of the reception unit 19 of the mobile apparatus 10 will be explained with reference to FIGS. 11, 13, and 18.

A signal received through the antenna 18 is amplified in the amplification unit 19a of the reception unit 19, demodulated in the demodulation unit 19b into the binary communication data 191, and then transmitted to ECU 20.

In FIG. 13, the oscillator 901 generates the local oscillation signal 902 of a frequency the same as that of the secondary modulated signal 553 generated in the transmission unit 55.

The π/2 phase shifter 903 is a circuit unit for shifting the phase of the local oscillation signal 902 by 90°.

The mixers 905 and 907 are circuit units (multipliers) for multiplying the reception signal 190 by the local oscillation signals 902 and 904, respectively, each of which is perpendicular to the reception signal 190, so as to frequency-convert the reception signal 190 into a signal whose frequency is lower than that of the carrier wave.

The outputs 906 and 909 of the mixers 905 and 907 are referred to as I component and q component, respectively.

The low-pass filters (LPFs) 908 and 911 are filters that each transmit signal components whose frequencies are lower than the chip rates (1/Tc) of spread codes ak and bk.

The mixers 903 and 904 each function as a quadrature detection means.

The comparators 912 and 915, which are A/D converters for so-called hard determination, are circuit units that each determine the LPF output signal with a predetermined level so as to perform PSK demodulation (refer to FIG. 18(e)).

The digital matching filter (DMF) 916 (or 921), which is a unit for performing reverse spread processing of the PN code PN0, is a circuit unit (refer to FIG. 18(f)) that performs correlation evaluation by making a sum-total calculation (refer to Equation (1)) of the exclusive logical sum of the PSK demodulated signal (c(t)) 914 (or 917) and the spread signal ak (or bk), in steps of a chip (Tc) over the one-bit length (Tb=Tc×Nc) of the information, and outputs the correlation value (the sum total).

Similarly, the digital matching filter (DMF) 918 (or 919), which is a unit for performing reverse spread processing of the PN code PN1, is a circuit unit (refer to FIG. 18(e)) that makes a sum-total calculation (refer to Equation (2)) and outputs a correlation value.

As described above, Equations (1) and (2) represent the correlation values of PN0 and PN1, respectively.

The calculator 926 (or 927) selects one, out of the I and Q components, whose correlation level is higher than a predetermined correlation level (correlation threshold value) and higher than that of the other (the sum total of which is smaller than that of the other).

The binary encoding calculation unit 930 compares the PN0 correlation value with the PN1 correlation value so as to select one, out of them, whose correlation level is higher than that of the other (the sum total of which is smaller than that of the other), and outputs a binary value corresponding to the selected correlation value (in the case where the correlation level of the PN0 is higher than that of the PN1, "0" is outputted, and in the case where the correlation level of the PN1 is higher than that of the PN0, "1" is outputted) (refer to FIG. 18(g)).

Because the chip phases of the transmission side and the reception side are not in synchronization with each other, the reverse spread processing in each of the digital matching filters (DMFs) 916, 921, 918, and 919 may not be able to detect the correlation peak, through the correlation-value calculation in steps of Tc; therefore, it is preferable that the correlation calculation is performed at two kinds of intervals (Tc) that are shifted by Tc/2 from each other, and one, out of PN0 and PN1, whose correlation is higher than that of the other is adopted.

In addition, each of "1" and "0" in FIG. 18(a) that represents the waveform of binary transmission data is a bit, and each of "1" and "0" in FIG. 18(b) is a chip. In this example, one bit consists of seven chips.

FIG. 19 is a timing chart for explaining the operation of the demodulation unit, which is a principal constituent element of the reception unit in the in-vehicle apparatus remote control system according to Embodiment 6; moreover, FIG. 19 is a chart for explaining the generation of the binary reception data 191 as the output of the demodulation unit 19b, in the case where signals from a plurality of mobile apparatuses (e.g., mobile apparatus No. 1, mobile apparatus No. 2, and the like) are received.

The communication signal from a mobile apparatus is configured with a reception evaluation bit portion for selecting a mobile apparatus, among a plurality of mobile apparatuses, the reception signal from which is modulated and outputted, and a communication main body portion that follows the reception evaluation bit portion. In this example, the foregoing "within a predetermined time of the initial reception" is a time corresponding to two bits.

As represented in FIG. 19, the PN0 correlation value 928 that satisfies the transmission-correlation threshold value corresponding to binary transmission data from mobile apparatus No. 1 is outputted, and then the PN1 correlation value 929 that satisfies the transmission-correlation threshold value corresponding to binary transmission data from mobile apparatus No. 2 is outputted.

The peak of the correlation value in each of the signal systems appears at a time interval Tb.

Only the signal, corresponding to mobile apparatus No. 2, which has a larger correlation value in a two-bit time of the initial communication, i.e., in which the probability of a communication error is low is selected, and the portion thereof after and including the communication main body portion is outputted as binary reception data.

In a smart entry/start system, as represented in FIG. 8, when the in-vehicle apparatus can establish communication with any one of the mobile apparatuses, a control logic comes into effect; therefore, even in the case where a plurality of signals from a plurality of mobile apparatuses is received, it is not required that a plurality of received data pieces is demodulated.

As described above, the in-vehicle apparatus remote control system according to Embodiment 6 includes a transmission means (the transmission unit 17 and the in-vehicle transmission antenna 11), of the in-vehicle apparatus 10, for transmitting an authentication-use inquiry signal and a presence-check inquiry signal to a plurality of mobile apparatuses 50; a reception means (the reception unit 57 and the reception antenna 58), of the mobile apparatus 50, for receiving the inquiry signal; a transmission means (the transmission unit 55 and the transmission antenna 56), of the mobile apparatus 50, for receiving the inquiry signal and then transmitting a response signal to the in-vehicle apparatus 10; a reception means (the reception unit 19 and the reception antenna 18), of the in-vehicle apparatus 10, for receiving the response signal transmitted from the transmission means of the mobile apparatus 50; and an operation control means (ECU 20) for controlling the operation states of in-vehicle devices (e.g., the engine control unit 32, the steering lock unit 32, the door lock unit 36, and the like) when the response code in the response signal transmitted to the in-vehicle apparatus 10 has been compared. The transmission means of the mobile apparatus 50 converts the response signal into binary data, modulates a carrier wave with a digital signal obtained through modulation by a plurality of pseudo-random codes corresponding to the binary data, and then transmits the response signal; the reception means of the in-vehicle apparatus 10 evaluates the correlation of the received response signal by use of a plurality of correlators corresponding to the plurality of pseudo-random codes and demodulates the response signal, based on the outputs of the plurality of correlators; in the case of receiving respective response signals from the two or more mobile apparatuses (50) within a predetermined time (within a time corresponding to two bits) of the initial reception, the transmission means of the in-vehicle apparatus (10) communicates with the mobile apparatus (50), among the two or more mobile apparatuses, which has transmitted a response signal of a maximum correlator output.

According to Embodiment 6, a plurality (e.g., two kinds) of PN codes are utilized, and the reception means of the in-vehicle apparatus performs reverse spread processing by use of a plurality (e.g., two kinds) of correlators; therefore, unlike the conventional technology set forth in Patent Document 4 (National Publication of International Patent Application No. 2003-500957), it is not required that as many correlators as the number of the mobile apparatuses are provided, whereby an effect is demonstrated in which an in-vehicle apparatus remote control system can be formed by means of a small-scale circuit and at low cost.

Moreover, in the case where signals from a plurality of mobile apparatuses are received, a reception signal of a maximal correlator output (a correlator output of a maximal correlation value) at the initial reception is selected so that communication with the mobile apparatus that has transmitted a response signal of a maximal correlator output is performed; therefore, a high-reliability in-vehicle apparatus remote control system can be realized in which the probability of a communication error is low.

In other words, according to Embodiment 6, an in-vehicle apparatus remote control system can be realized in which the responsiveness can be enhanced through approximately simultaneous communication with a plurality of mobile apparatuses (multiplex communication) and the reliability of communication is high, and that is small-sized, inexpensive, and suitable for preventing unauthorized use and theft of a vehicle.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A vehicle remote control system comprising:
   an in-vehicle transmission unit which transmits an authentication-use inquiry signal and a presence-check inquiry signal;
   two or more mobile apparatuses, each comprising a reception unit which receives the presence-check inquiry signal and the authentication-use inquiry signal and a transmission unit which transmits to the in-vehicle apparatus a response signal to the presence-check inquiry signal and the authentication-use inquiry signal;
   an in-vehicle reception unit which receives the response signals transmitted from the transmission units of the two or more mobile apparatuses; and
   an in-vehicle operation control unit which controls an operation state of the in-vehicle apparatus when a response code in at least one of the response signals received by the in-vehicle apparatus has been compared,
   wherein the transmission units of the two or more mobile apparatuses convert the response signals into binary data, modulate a carrier wave with a digital signal obtained through modulation by a plurality of pseudo-random codes corresponding to the binary data, and then transmit the response signals,
   wherein the reception unit of the in-vehicle apparatus evaluates correlations of the received response signals by use of a plurality of correlators corresponding to the plurality of pseudo-random codes and demodulates the response signals, based on outputs of the plurality of correlators,
   wherein the transmission unit of the in-vehicle apparatus retransmits the presence-check inquiry signal or the authentication-use inquiry signal to the two or more mobile apparatuses when there have been outputs from the plurality of correlators within a predetermined time of the occurrence of the pseudo-random codes,
   wherein the response signals from the transmission units of the two or more mobile apparatuses include a communication-error detection code,
   wherein the reception unit of the in-vehicle apparatus has a communication-error detection unit which detects, by use of the communication-error detection code, whether or not there exists a communication error, and
   wherein the transmission unit of the in-vehicle apparatus retransmits the presence-check inquiry signal or the authentication-use inquiry signal to the two or more mobile apparatuses when the communication-error detection unit detects a communication error.

2. The vehicle remote control system according to claim 1, wherein the modulation of a carrier waves in the transmission units of the two or more mobile apparatuses is performed by frequency-shift keying or phase-shift keying, and the reception unit of the in-vehicle apparatus performs quadrature detection, reverse spread processing, and then demodulation, of the response signals.

3. The vehicle remote control system according to claim 1, wherein the reception unit of the in-vehicle apparatus communicates to the in-vehicle operation control unit only one response signal, among received response signals, which is firstly demodulated by the reception unit of the in-vehicle apparatus.

4. The vehicle remote control system according to claim 1, wherein the two or more mobile apparatuses each have an inherent identification number, and a time difference between a response signal transmission timing from one of the two or more mobile apparatuses and a response signal transmission timing from another of the two or more mobile apparatuses differs depending on the inherent identification number.

5. The vehicle remote control system according to claim 1, wherein the two or more mobile apparatuses each have an inherent identification number;
   an identification code for one of the two or more mobile apparatuses corresponding to an inherent identification number is included at a foremost position of a response signal transmitted from the one of the two or more mobile apparatuses; and
   identification codes are configured in such a way that, even when an identification code in a response signal transmitted from one mobile apparatus coincides with an identification code in a response signal transmitted from another mobile apparatus, at least one of the identification codes can be demodulated.

6. The vehicle remote control system according to claim 1, wherein the carrier wave in the transmission unit of the in-vehicle apparatus has an LF-band frequency.

7. The vehicle remote control system according to claim 1, wherein, in the case of receiving respective response signals from the two or more mobile apparatuses within a predetermined time, the transmission unit of the in-vehicle apparatus communicates with one mobile apparatus, among the two or more mobile apparatuses, which transmitted a response signal of a maximum correlator output.

8. A vehicle remote control method comprising:
transmitting an authentication-use inquiry signal and a presence-check inquiry signal to two or more mobile apparatuses from an in-vehicle transmission unit;
receiving the authentication-use inquiry signal and a presence-check inquiry signal by the two or more mobile apparatuses;
transmitting response signals to the in-vehicle apparatus from the two or more mobile apparatuses;
receiving the response signals transmitted by the two or more mobile apparatuses at the in-vehicle apparatus; and
controlling the operation state of the in-vehicle apparatus when a response code in a response signal transmitted to the in-vehicle apparatus has been compared,
wherein, in the transmitting the authentication-use inquiry signal and the presence-check inquiry signal, the authentication-use inquiry signal and the presence-check inquiry signal are converted into binary data, a carrier wave is modulated with a digital signal obtained through modulation by a plurality of pseudo-random codes corresponding to the binary data, and then the signal is transmitted;
wherein, in the receiving the response signals correlations of the received response signals are evaluated by use of a plurality of correlators corresponding to the plurality of pseudo-random codes, and a response signal is demodulated, based on outputs of the plurality of correlators; and
wherein, in the transmitting the authentication-use inquiry signal and the presence-check inquiry signal the authentication-use inquiry signal are retransmitted to the mobile apparatus when there have been outputs from the plurality of correlators within a predetermined time of the occurrence of the pseudo-random code,
wherein the response signals from the transmission units of the two or more mobile apparatuses include a communication-error detection code;
wherein the reception unit of the in-vehicle apparatus has a communication-error detection unit which detects, by use of the communication-error detection code, whether or not there exists a communication error; and
wherein the transmission unit of the in-vehicle apparatus retransmits the presence-check inquiry signal or the authentication-use inquiry signal to the two or more mobile apparatuses when the communication-error detection unit detects a communication error.

* * * * *